(12) United States Patent
Chadani et al.

(10) Patent No.: US 8,116,661 B2
(45) Date of Patent: Feb. 14, 2012

(54) PROCESS CARTRIDGE WITH A COUPLING MEMBER AND A RETAINING PORTION FOR THE COUPLING MEMBER

(75) Inventors: Kazuo Chadani, Suntoh-gun (JP); Tomonori Mori, Numazu (JP); Koji Hashimoto, Suntoh-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/984,874

(22) Filed: Jan. 5, 2011

(65) Prior Publication Data
US 2011/0097108 A1    Apr. 28, 2011

Related U.S. Application Data

(62) Division of application No. 11/869,344, filed on Oct. 9, 2007, now Pat. No. 7,890,025.

(30) Foreign Application Priority Data

Dec. 11, 2006 (JP) ................................ 2006-332838
Oct. 3, 2007 (JP) ................................ 2007-259661

(51) Int. Cl.
*G03G 21/16* (2006.01)
*G03G 15/00* (2006.01)
*G03G 15/08* (2006.01)

(52) U.S. Cl. .......................... 399/111; 399/167; 399/279
(58) Field of Classification Search ................. 399/111, 399/167, 265, 279
See application file for complete search history.

(56) References Cited

U.S. PATENT DOCUMENTS

| 3,985,436 | A | 10/1976 | Tanaka et al. |
| 4,835,565 | A | 5/1989 | Nagatsuna et al. |
| 5,070,366 | A | 12/1991 | Tsuchiya |
| 5,258,811 | A | 11/1993 | Miyake et al. |

(Continued)

FOREIGN PATENT DOCUMENTS

CA    2 667 787    6/2008
(Continued)

OTHER PUBLICATIONS

PCT International Search Report in PCT Application No. PCT/JP2007/071675, issued Jan. 30, 2008, Written Opnion of International Searching Authority, and Notification of Transmittal thereof.

(Continued)

*Primary Examiner* — Sandra Brase
(74) *Attorney, Agent, or Firm* — Fitzpatrick, Cella, Harper & Scinto

(57) ABSTRACT

A process cartridge is provided that is detachably mountable to a main assembly of an electrophotographic image forming apparatus. The cartridge includes a photosensitive drum and a developing roller. A coupling member is provided adjacent to one axial end of the developing roller, with the coupling member including a driven portion, an intermediary portion, and a driving portion. A retaining portion is also provided, with the retaining portion configured and positioned to retain an axis of the driving portion of the coupling member in a position that is deviated from the axis of the developing roller in a direction crossing the axis of the developing roller so as to enable engagement of the driving portion with a driving member of the image forming apparatus when the process cartridge is inserted into the main assembly of the apparatus with the developing roller being in contact with the photosensitive drum.

28 Claims, 20 Drawing Sheets

U.S. PATENT DOCUMENTS

| | | |
|---|---|---|
| 6,285,847 B1 | 9/2001 | Tanizaki et al. |
| 6,463,234 B2 | 10/2002 | Arimitsu et al. |
| 6,684,041 B2 | 1/2004 | Yokomori et al. |
| 6,907,212 B2 | 6/2005 | Harada et al. |
| 6,980,759 B2 | 12/2005 | Kanno et al. |
| 7,292,808 B2 | 11/2007 | Murofushi |
| 7,395,014 B2 | 7/2008 | Kim et al. |
| 7,890,025 B2* | 2/2011 | Chadani et al. ............... 399/167 |
| 7,899,364 B2* | 3/2011 | Chadani et al. ............... 399/167 |
| 2001/0017994 A1 | 8/2001 | Arimitsu et al. |
| 2002/0110388 A1 | 8/2002 | Yokomori et al. |
| 2006/0034637 A1 | 2/2006 | Kim et al. |
| 2006/0193653 A1 | 8/2006 | Oguma et al. |
| 2006/0198654 A1 | 9/2006 | Noda et al. |
| 2010/0329732 A1* | 12/2010 | Chadani et al. ............... 399/111 |

FOREIGN PATENT DOCUMENTS

| | | |
|---|---|---|
| CN | 1 734 365 | 2/2006 |
| EP | 1 178 370 | 6/2002 |
| GB | 2 141 520 | 12/1984 |
| JP | 1-177759 | 12/1989 |
| JP | 1-178225 | 12/1989 |
| JP | 2-021049 | 1/1990 |
| JP | 2-238469 | 9/1990 |
| JP | 4-43378 | 2/1992 |
| JP | 7-261590 | 10/1995 |
| JP | 9-171339 | 6/1997 |
| JP | 2900530 | 3/1999 |
| JP | 11-338211 | 12/1999 |
| JP | 2000-214654 | 8/2000 |
| JP | 2000-284592 | 10/2000 |
| JP | 2001-255806 | 9/2001 |
| JP | 2001-337511 | 12/2001 |
| JP | 2002-6722 | 1/2002 |
| JP | 2002-328499 | 11/2002 |

OTHER PUBLICATIONS

Singapore Search Report and Written Opinion in Singapore Application No. 200902246-8, issued Nov. 30, 2009.

Japanese Office Action dated Sep. 15, 2009, in Japanese Application No. 2007-259661, and English-language translation thereof.

Singapore Search Report and Written Opinion dated Aug. 27, 2010, in Singapore Application No. 200902246-8.

English-language translation of Vietamese Office Action dated Oct. 4, 2010, in Vietnamese Application No. 1-2009-00989.

Communication in Korean Patent Application No. 10-2009-7012315, dated Nov. 18, 2010.

Office Action in Japanese Patent Application No. 2009-258687, dated Nov. 16, 2010.

Apr. 14, 2011 Office Action in Chinese Patent Application No. 200780045876.6 (with English translation).

Decision on Grant in Russian Patent Application No. 2009126579(036993) (with English translation).

English translation of Nov. 18, 2010 Communication in Korean Patent Application No. 10-2009-7012315.

Notice of Allowance in Korean Patent Application No. 10-2011-7011314, issued Jul. 5, 2011.

Nov. 14, 2011 Office Action in Canadian Patent Application No. 2,669,843.

\* cited by examiner (a)

(b)

PROCESS CARTRIDGE WITH A COUPLING MEMBER AND A RETAINING PORTION FOR THE COUPLING MEMBER

This is a divisional of U.S. patent application Ser. No. 11/869,344, filed Oct. 9, 2007, now U.S. Pat. No. 7,890,025.

FIELD OF THE INVENTION AND RELATED ART

Field of the Invention

The present invention relates to a process cartridge and an electrophotographic image forming apparatus which uses the same.

Here, the electrophotographic image forming apparatus forms an image on a recording material using an electrophotographic type process. Examples of the electrophotographic image forming apparatus include an electrophotographic copying machine, an electrophotographic printer (for example, a laser beam printer, LED printer, and so on), a facsimile device, and a word processor.

The process cartridge is a cartridge which comprises at least developing means and an electrophotographic photosensitive drum integrally formed in the cartridge, and it is detachably mountable to the main assembly of the electrophotographic image forming apparatus.

Heretofore, the photosensitive drum and the process means actable on the photosensitive drum have been integrally unified into a cartridge in the electrophotographic image forming apparatus using the electrophotographic image forming process. A process-cartridge type electrophotographic image forming apparatus in which this cartridge is detachably mountable to the main assembly of the electrophotographic image forming apparatus, is employed. In this process-cartridge type electrophotographic image forming apparatus, the maintenance operation of the apparatus can be performed without depending on a service person, and therefore, the operability can be remarkably improved. Therefore, this process-cartridge type electrophotographic image forming apparatus is used widely.

Light corresponding to the image information, which can be generated by, for example, a laser, an LED, or a lamp, is projected onto the photosensitive drum in the electrophotographic image forming apparatus. By doing so, an electrostatic latent image is formed on the photosensitive drum. This electrostatic latent image is developed by a developing device. The developed image formed on the photosensitive drum is transferred onto a recording material. By doing so, the image is formed on the recording material.

JP 2001-255806A discloses a color electrophotographic image forming apparatus of the in-line type in which a plurality of process cartridges are put in order by the one array. The process cartridge has a drum unit which includes a photosensitive drum, and a developing unit which includes a developing roller, and they are rotatably connected relative to each other by a pin. The photosensitive drum is provided with a cartridge coupling on an axial end of the photosensitive drum. When the process cartridge is mounted to the main assembly of the apparatus, a cartridge coupling engages with a main assembly coupling provided in the main assembly of the apparatus, so that the driving force is transmitted. A driving force is transmitted to the developing roller through the idler gears from the input gear as the development driving force transmission member provided on the pin of the developing unit. When the process cartridge is mounted to the main assembly of the apparatus The input gear is engaged with the gear provided in the main assembly of the apparatus, and the engagement to receive the driving force. More particularly, the drive transmissions to the photosensitive drum and to the developing roller from the main assembly of the apparatus are carried out independently from each other.

However, recently, further downsizing and image quality improvement of the process cartridge and the electrophotographic image forming apparatus are desired. The input gear is provided on the swing center which does not change in the position even if the developing unit swings in the conventional example. For this reason, the developing roller requires a space in order to receive the driving force from the input gear through the idler gear of the process cartridge. The rotational accuracy of the developing roller is influenced by the engagement among the input gear, the idler gear, and the main assembly gear.

SUMMARY OF THE INVENTION

The present invention further develops the prior art structures mentioned above.

Accordingly, it is a principal object of the present invention to provide a process cartridge and a small size electrophotographic image forming apparatus in which a rotational driving force is directly inputted to the developing roller through the shaft coupling member from the main assembly of the apparatus independently from the driving input to the photosensitive drum.

It is another object of the present invention to provide a process cartridge and an image forming apparatus in which the rotational accuracy of the developing roller is improved, so that the image quality is improved.

According to another aspect of the present invention, there is provided a process cartridge detachably mountable to a main assembly of an electrophotographic image forming apparatus. The main assembly includes a first rotatable main assembly drive transmission member, and a second rotatable main assembly drive transmission member. The process cartridge comprises an electrophotographic photosensitive drum; a developing roller for developing an electrostatic latent image formed on said electrophotographic photosensitive drum with a developer; a drum coupling member, provided on one axial end of the electrophotographic photosensitive drum, for engaging with the first main assembly drive transmission member and transmitting a first rotational driving force to the electrophotographic photosensitive drum, when the process cartridge is mounted to the main assembly of the apparatus along an axial direction of the electrophotographic photosensitive drum; a shaft coupling member, provided on one axial end of the developing roller, for transmitting a second rotational driving force with a deviation permitted between an axis of the second main assembly drive transmission member and an axis of the developing roller. The shaft coupling member includes an engaging portion for engaging with the second main assembly drive transmission member and receiving the second rotational driving force, when the process cartridge is mounted to the main assembly of the apparatus. The engaging portion is movable in a direction crossing with the axial direction of the developing roller when the process cartridge enters the main assembly of the apparatus.

According to another aspect of the present invention, there is provided an electrophotographic image forming apparatus for forming an image on a recording material, comprising: (i) a rotatable first main assembly drive transmission member and a rotatable second main assembly drive transmission member; and (ii) a process cartridge mounted detachably to the main assembly of the apparatus of the electrophotographic image forming apparatus. The process cartridge includes: an electrophotographic photosensitive drum; a developing roller for developing an electrostatic latent image formed on the electrophotographic photosensitive drum with a developer; a drum coupling member, provided on one axial end of the electrophotographic photosensitive drum, for engaging with the first main assembly drive transmission member and transmitting a first rotational driving force to the electrophotographic photosensitive drum, when the process cartridge is mounted to the main assembly of the apparatus along an axial direction of the electrophotographic photosensitive drum; and a shaft coupling member, provided on one axial end of the developing roller, for transmitting a second rotational driving force with a deviation permitted between an axis of the second main assembly drive transmission member and an axis of the developing roller. The shaft coupling member includes an engaging portion for engaging with the second main assembly drive transmission member and receiving the second rotational driving force, when the process cartridge is mounted to the main assembly of the apparatus. The engaging portion is movable in a direction crossing with the axial direction of the developing roller when the process cartridge enters the main assembly of the apparatus. The apparatus also includes (iii) feeding means for feeding the recording material.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

The preferred embodiments of the present invention will be described in conjunction with the accompanying drawings.

Embodiment 1

Referring to FIG. 1-FIG. 15, the process cartridge and the electrophotographic image forming apparatus according to an embodiment of the present invention will be described.

Figure 1:
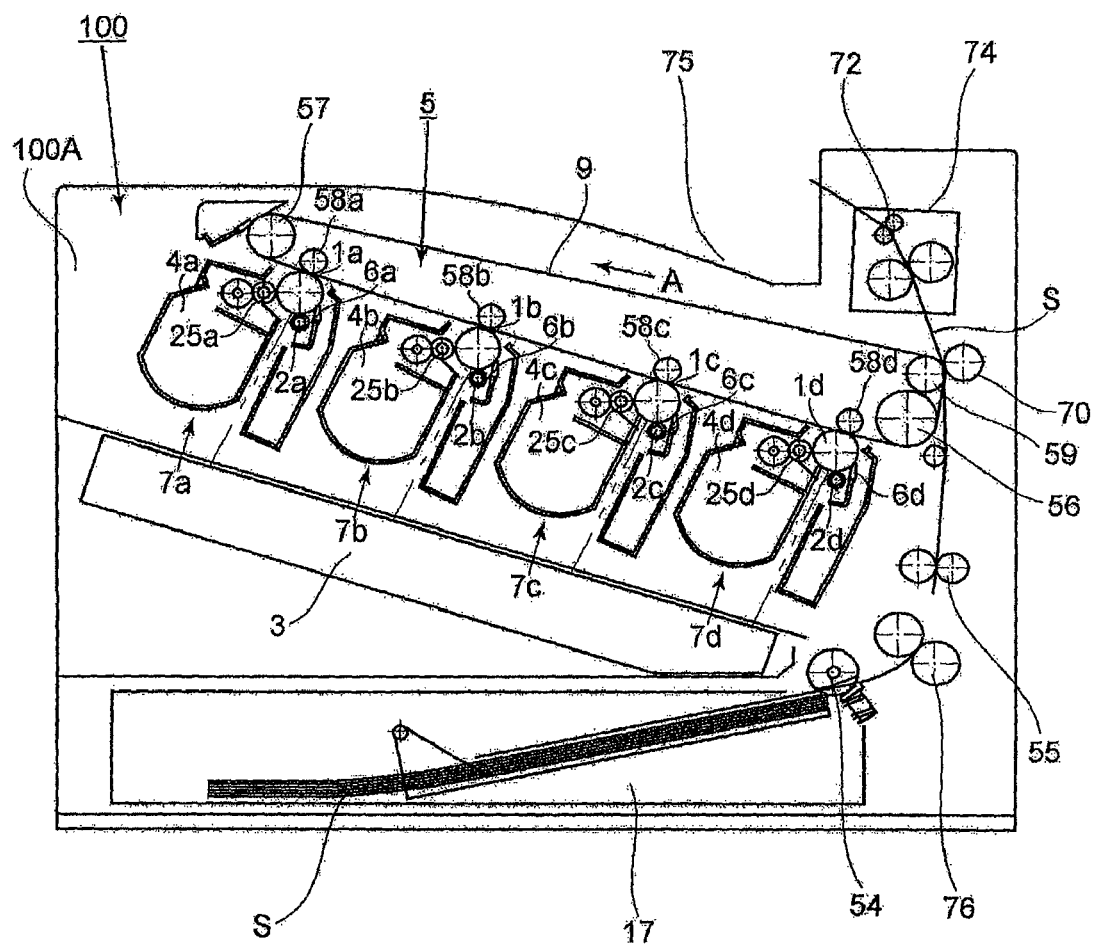
FIG. 1 is a general arrangement of a color electrophotographic image forming apparatus according to an embodiment 1 of the present invention.

FIG. 1 illustrates a general arrangement of the color electrophotographic image forming apparatus according to this embodiment.

(General Arrangement of Image Forming Apparatus)

FIG. 1 shows a general arrangement of an electrophotographic image forming apparatus (hereinafter, image forming apparatus) 100. As shown in FIG. 1, four detachably mountable process cartridges 7 (7a, 7b, 7c, 7d) are mounted by mounting members (unshown). In FIG. 1, the process cartridges 7 are inclined relative to the horizontal direction in the main assembly of the apparatus 100.

Each process cartridge 7 has an electrophotographic photosensitive member drum (hereinafter, photosensitive drum) 1 (1a, 1b, 1c, 1d). Around the photosensitive drum 1 of the process cartridge 7, there are provided process means, such as a charging roller 2 (2a, 2b, 2c, 2d), a developing roller 25 (25a, 25b, 25c, 25d), and a cleaning member 6 (6a, 6b, 6c, 6d), are provided integrally. The charging roller 2 has a function of charging the surface of the photosensitive drum 1 uniformly. The developing roller 25 has a function of developing, with the toner, a latent image formed on the photosensitive drum 1 into a visualized image. The cleaning member 6 removes the toner which remains on the photosensitive drum 1, after the developer image formed on the photosensitive drum 1 is transferred onto a recording material.

A scanner unit 3 for forming the latent image on the photosensitive drum 1 by exposing the photosensitive drum 1 selectively on the basis of the image information, is provided in a lower part of the process cartridge 7.

A cassette 17, which contains the recording materials S, is provided in a lower position of the main assembly 100A of the apparatus. A recording material feeding means is provided so that the recording material S passes through a secondary transfer roller 70 portion and a fixing portion 74 portion to the upper portion of apparatus main assembly 100A. In the detail, the recording material fixing means comprises a feeding roller 54 for carrying out the separation and feeding of the recording materials S from the cassette 17 one by one. It further comprises a conveying roller pair 76 for feeding the fed recording material S, and a resist roller pair 55 for synchronizing the transfer of the latent image formed on the photosensitive drum 1 with the movement of the recording material S. In an upper part of the process cartridge 7 (7a, 7b, 7c, 7d), an intermediary transfer unit 5 as the intermediary transfer means for transferring the toner images formed on the photosensitive drums 1 (1a, 1b, 1c, 1d), is provided. The intermediary transfer unit 5 comprises a driving roller 56 and a follower roller 57. It further comprises primary transfer rollers (58a, 58b, 58c, 58d) provided in the position opposed to the photosensitive drum 1 for each color, and an opposing roller 59 opposed to a secondary transfer rollers 70, respectively. A transfer belt 9 is extended around the rollers. The circulative movement of the transfer belt 9 is carried out so that the belt 9 contacts all the photosensitive drums 1. By applying a voltage to the primary transfer rollers (58a, 58b, 58c, 58d), the toner images are transferred primarily onto the transfer belt 9 from the photosensitive drums 1. The voltage is applied between the opposing roller 59 disposed in the transfer belt 9, and the secondary transfer rollers 70 to transfer the toner image from the transfer belt 9 onto the recording material S.

Each photosensitive drum 1 is rotated in the image forming operation and the drum 1 is charged uniformly by the charging roller 2. Subsequently, the photosensitive drum 1 is selectively exposed to light with the scanner unit 3. By doing so, an electrostatic latent image is formed on the photosensitive drum 1. The latent image is developed by the developing roller 25. This forms the color developer image on each photosensitive drum 1. In synchronism with this image formation, a resist roller pair 55 feeds the recording material S to the secondary transfer position where the opposing roller 59 and the secondary transfer roller 70 are opposed to each other with the transfer belt 9 therebetween. An image transfer bias voltage is applied to the secondary transfer roller 70 to transfer the secondary color developer images on the transfer belt onto the recording material S. By doing so, a color image is formed on the recording material S. The recording material S which has the formed color image is heated and pressed by the fixing portion 74, so that the developer image is fixed. Thereafter, the recording material S is discharged to the discharging portion 75 by the discharging roller 72. The fixing portion 74 is disposed in the upper position of main assembly 100A of the apparatus 100.

(Process Cartridge)

Figure 2:
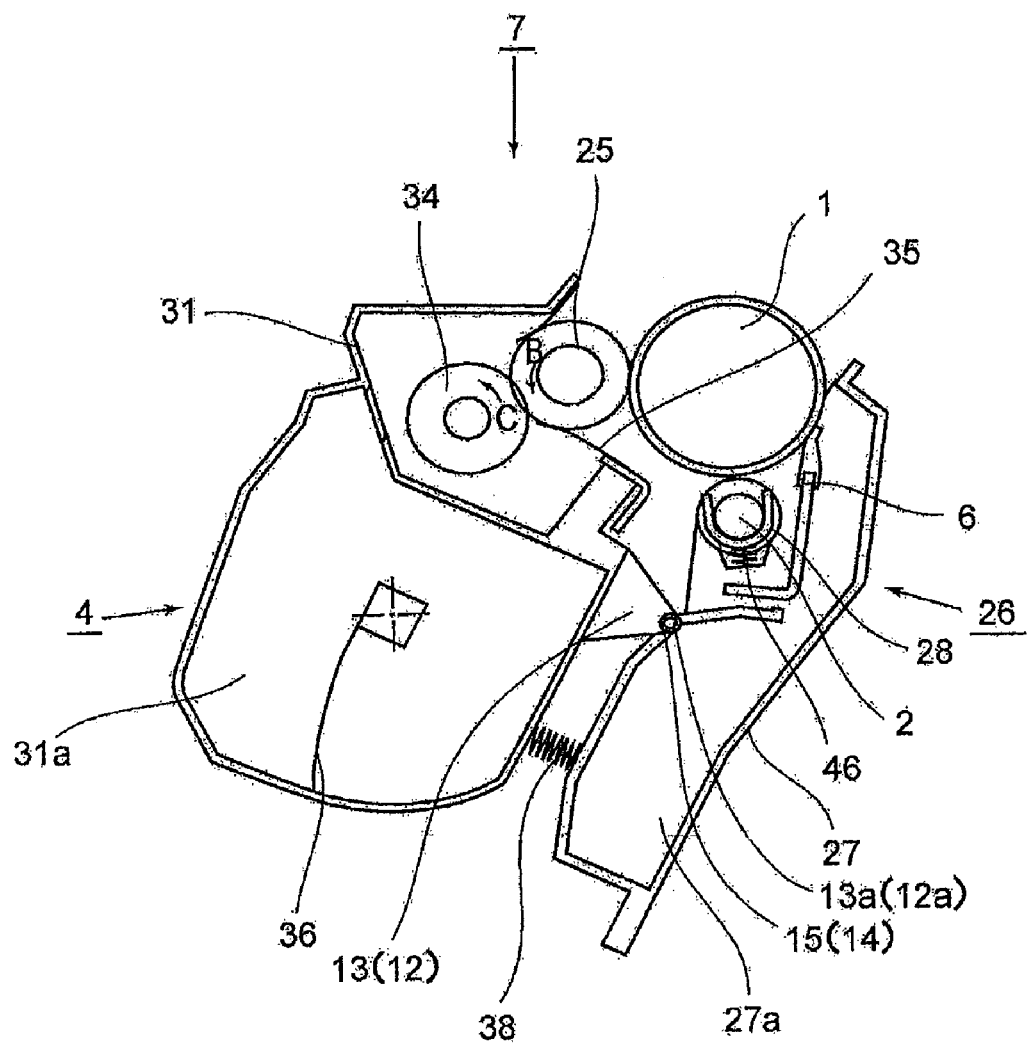
FIG. 2 is a sectional view of a process cartridge according to Embodiment 1.
Figure 3:
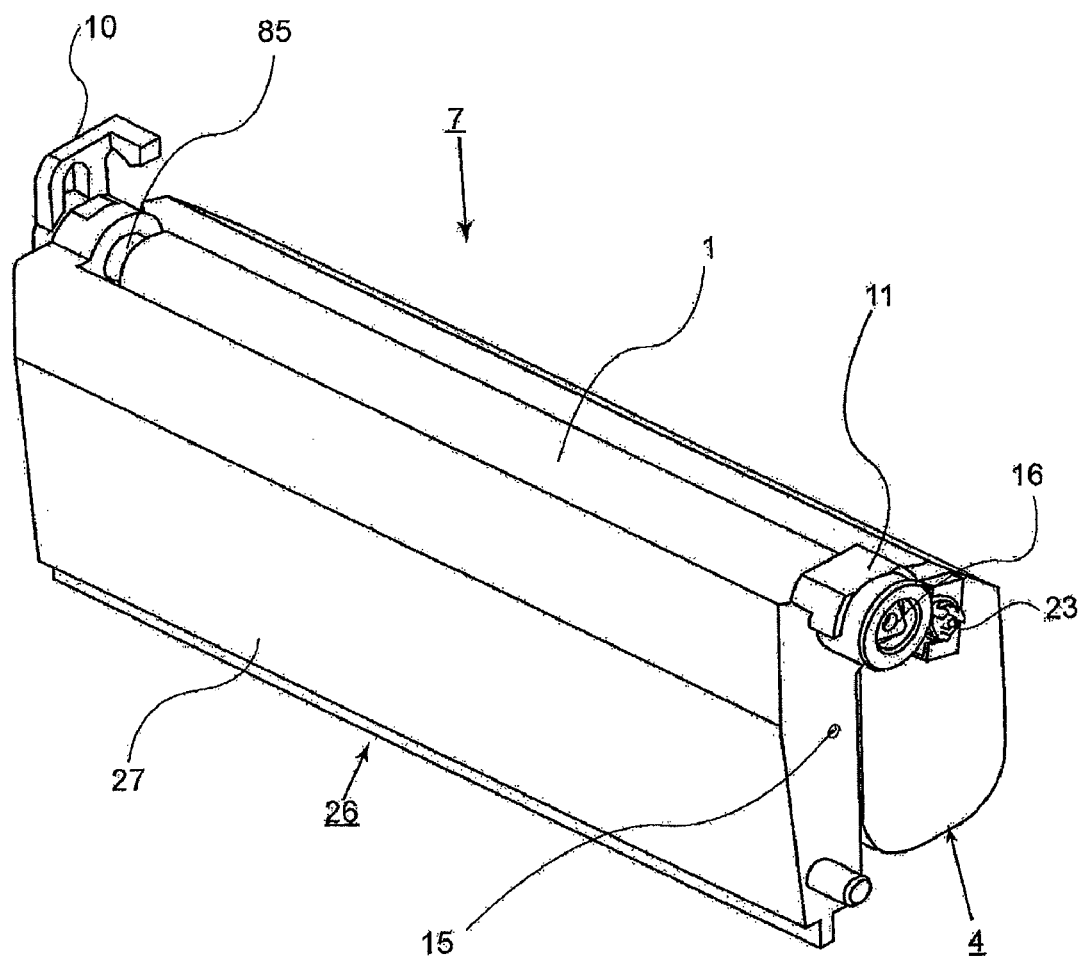
FIG. 3 is the perspective view of an outer appearance of the process cartridge according to Embodiment 1.
Figure 4:
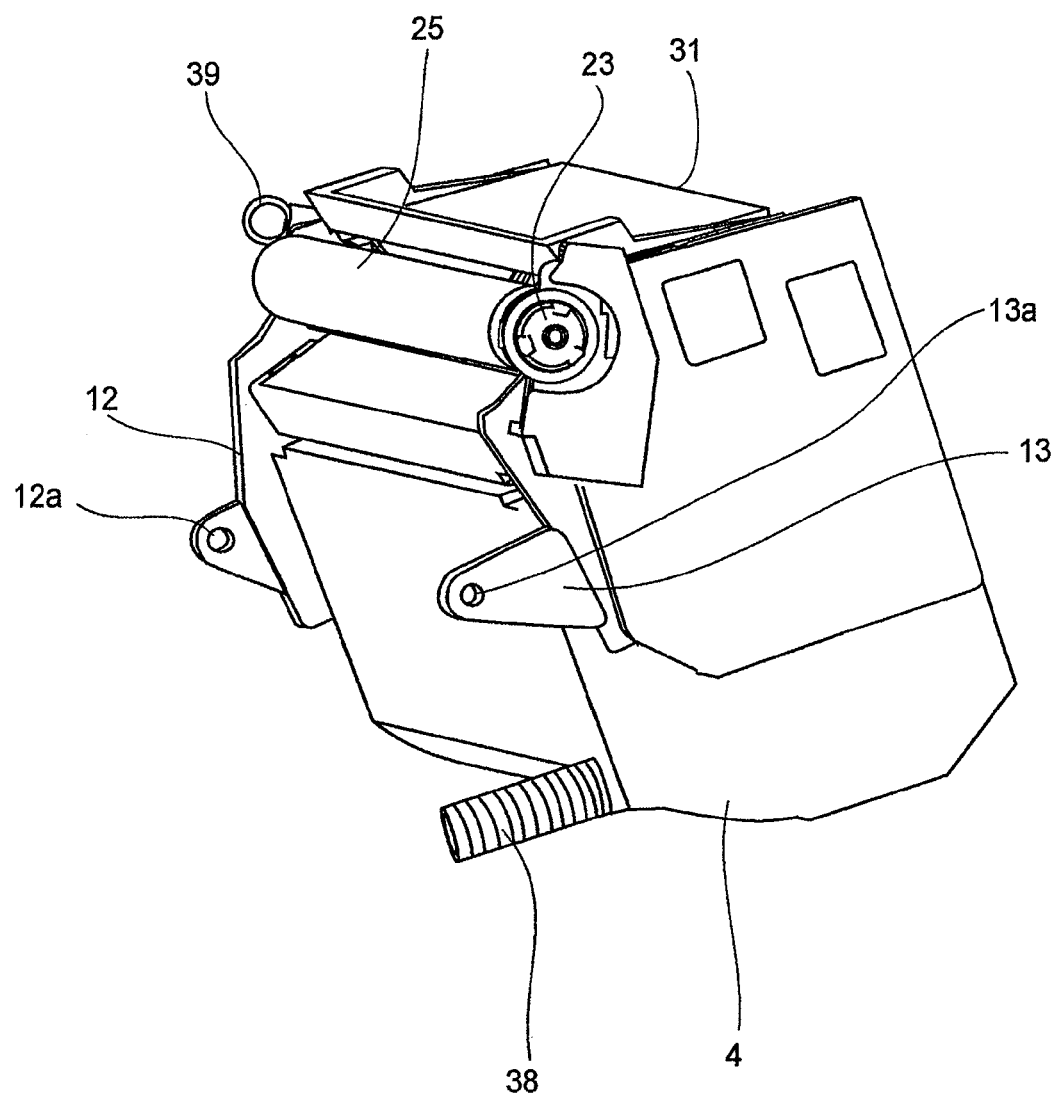
FIG. 4 is a perspective view of a developing unit according to Embodiment 1.

Referring to FIG. 2-FIG. 4, the process cartridge 7 of this embodiment will be described. FIG. 2 is a major section of the process cartridge 7 which contains the developer (hereinafter, toner). A cartridge 7a which contains the toner of the yellow color, a cartridge 7b which contains the toner of a magenta color, a cartridge 7c which contains the toner of the cyan color, and a cartridge 7d which contains the toner of the black color, have the same structures.

Each process cartridge 7 (7a, 7b, 7c, 7d) includes a drum unit 26 as a first frame, and a developing unit 4 (4a, 4b, 4c, 4d) as a second frame. The drum unit 26 is provided with the photosensitive drum 1 (1a, 1b, 1c, 1d), and the charging roller 2 (2a, 2b, 2c, 2d) and the cleaning member 6 (6a, 6b, 6c, 6d). And, the developing unit 4 is provided with a developing roller 25.

The drum unit 26 includes a cleaning frame 27 and the photosensitive drum 1 is rotatably mounted to it through a drum-front bearing 10 and a drum-rear bearing 11 (FIG. 3). The end of the photosensitive drum 1 is provided with the drum coupling 16 and the flange 85.

Around the photosensitive drum 1, as mentioned above, the charging roller 2 and the cleaning member 6 are disposed. The residual toner removed by the cleaning member 6 from the photosensitive drum 1 surface is allowed to fall in a removed toner chamber 27a. A driving force is transmitted to the drum unit 26 from a main assembly driving motor (unshown) as a driving source, so that the photosensitive drum 1 is rotated correspondingly to the image forming operation process. The charging roller 2 is rotatably mounted to the cleaning frame 27 through the charging roller bearings 28. And, it is pressed by a charging roller pressing member 46 toward the photosensitive drum 1, by which it is rotated by the photosensitive drum 1.

The developing unit 4 comprises a developing roller 25 which contacts the photosensitive drum 1 and is rotated in the direction of arrow B, and a developing device frame 31 for supporting the developing roller 25. The developing roller 25 is rotatably supported on the developing device frame 31 through a developing-device-front bearing 12 and a developing-device-rear bearing 13 which are mounted to the respective sides of the developing device frame 31 (FIG. 4). A toner supplying roller 34 rotates in the direction of arrow C, contacting to the outer periphery of the developing roller 25. A developing blade 35 regulates the toner layer thereon, contacting the outer periphery of the developing roller 25. In the toner accommodating portion 31a of the developing device frame 31, the toner feeding member 36 for agitating the contained toner and for feeding the toner to the toner supplying roller 34 is provided.

FIG. 3 is an outer appearance perspective view of the process cartridge 7. The developing unit 4 is rotatably mounted to the drum unit 26. A front supporting pin 14 and a rear supporting pin 15, which are press-fitted in the cleaning frame 27 are engaged into the hanging holes 12a and 13a of the developing-device-front bearing 12 and the developing-device-rear bearing 13. By doing so, the developing unit 4 is rotatably supported about the axis of the supporting pins 14 and 15 to the cleaning frame 27 (FIG. 2). The cleaning frame 27 is provided with a drum-front bearing 10 and a drum-rear bearing 11 for supporting the photosensitive drum 1 rotatably. The drum-rear bearing 11 supports a drum coupling 16 connected with the photosensitive drum 1. The drum-front bearing 10 supports the flange 85. The drum coupling 16 transmits the rotational driving force (first rotational driving force) to the photosensitive drum 1 from the main assembly 100A of the apparatus 100.

The developing unit 4 shown in FIG. 4 is urged to the drum unit 26 by a pressing spring 38 provided in the developing device frame 31, and a tension spring (unshown) provided in the developing-device-front bearing 12 during the image formation of the process cartridge 7. The developing roller 25 is revolved by the pressing springs 38 and the tension spring 39 about the holes 12a and 13a of the developing-device-front bearing 12 and the developing-device-rear bearing 13, so that it is contacted to the photosensitive drum 1.

In a contact type developing system which effects the development with the contact between the photosensitive drum 1 and the developing roller 25, it is desirable that the photosensitive drum 1 is a rigid member and the developing roller 25 is an elastic member. This elastic member may be a solid rubber monolayer, and it may have a solid rubber layer and a resin material coating thereon in consideration of the charging application property to the toner.

The image forming operation of the process cartridge 7 will be described (FIG. 1 and FIG. 2). When the image information is supplied to the image forming apparatus 100, the main assembly driving motor (unshown) starts its rotation and the rotational driving forces are transmitted to the photosensitive drum 1, to the developing roller 25, to the toner supplying roller 34, and to the toner feeding member 36. The charging bias voltage is applied to the charging roller 2 from the main assembly 100A of the apparatus 100 to charge electrically the surface of the photosensitive drum 1 uniformly. Corresponding to the image information, exposure is effected by the scanner unit 3, so that a latent image is formed on the photosensitive drum 1.

The toner in the toner accommodating portion 31a is fed by the rotation of the toner feeding member 36 to the toner supplying roller 34. The toner supplying roller 34 rotates to supply the toner to the outer periphery of the rotating developing roller 25. The supplied toner is triboelectrically charged by the developing blade 35 on the outer periphery of the developing roller 25. The developing bias voltage is applied to the developing roller 25 from the voltage source portion (unshown) provided in the image forming apparatus 100. By doing so, the electrostatic latent image formed on the photosensitive drum 1 is developed. Here, the developing roller 25 is provided opposed to the photosensitive drum 1. The developing roller 25 is contacted to the photosensitive drum 1 and develops the electrostatic latent image formed on the photosensitive drum 1.

(Mechanism for Mounting Process Cartridge to Main Assembly of Image Forming Apparatus)

Figure 5:
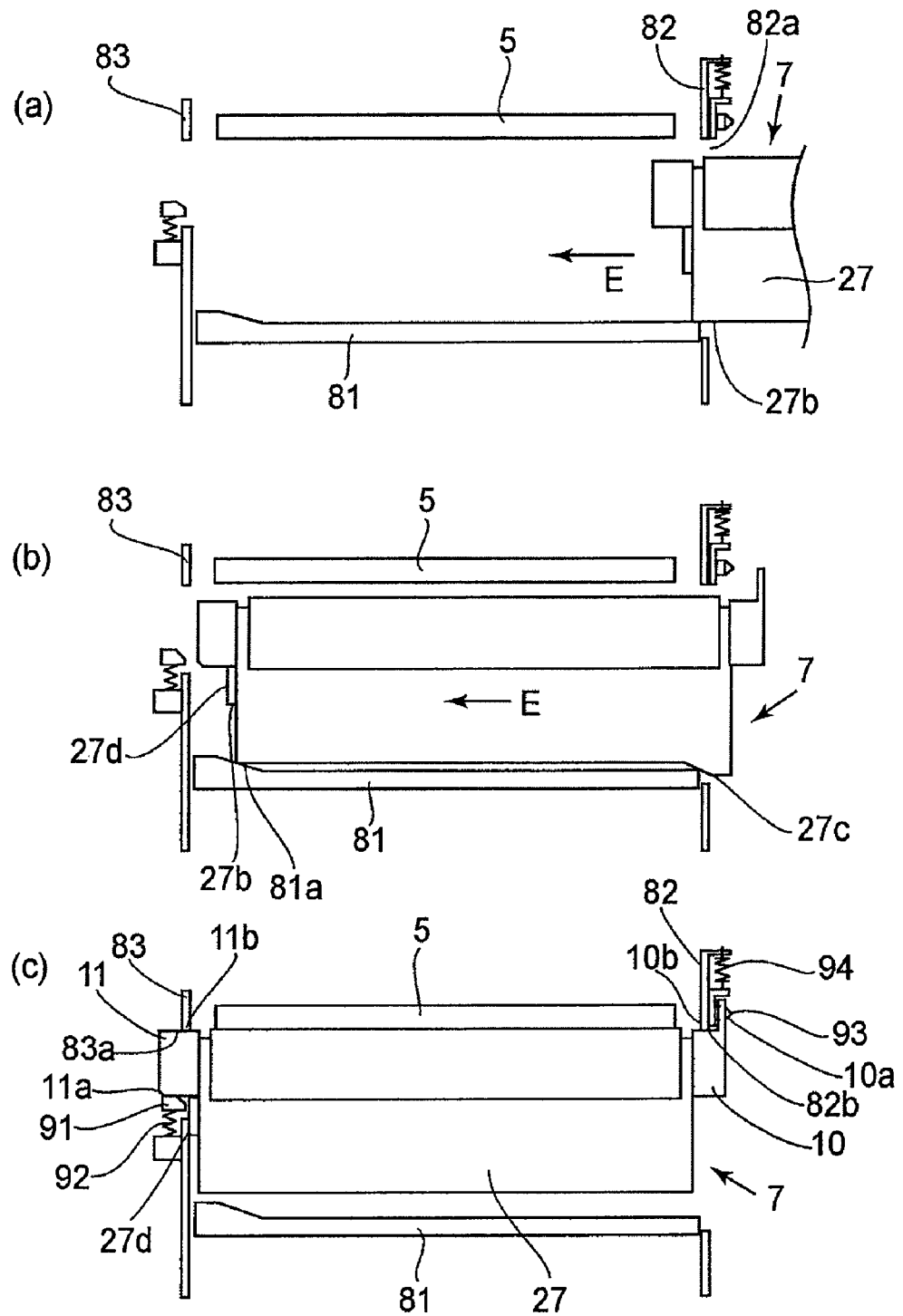
FIG. 5 illustrates a mounting operation relative to a main assembly of the image forming apparatus of the process cartridge according to Embodiment 1.

Referring to FIG. 5, the mounting mechanism, according to this embodiment, for mounting the process cartridge 7 in the apparatus main assembly 100A will be described.

In FIG. 5, (a) illustrates a state before the setting, in the apparatus main assembly 100A, of the process cartridge 7. In the state shown in (a), the process cartridge 7 is mounted in the direction of arrow E through an opening 82a provided in a front side plate 82 of the apparatus main assembly 100A. In that case, a guide portion 27b integrally provided in the cleaning frame 27 of the process cartridge 7 is guided on a main assembly guide member 81 provided in the main assembly 100A of the apparatus. The main assembly guide member 81 is the mounting member for mounting the process cartridge 7 dismountably.

In FIG. 5, (b) illustrates the state where the mounting of the process cartridge 7 to the apparatus main assembly 100A is starting to be, but not yet completed. The guiding member 81 provided in the main assembly 100A of the apparatus is provided with an inclined portion 81a inclined upwardly toward the downstream direction with respect to the mounting direction. The cleaning frame 27 is provided with a downwardly inclined portion 27c at an upstream end with respect to the mounting direction. When the process cartridge 7 is mounted to the apparatus main assembly 100A, the guide portion 27b of the cleaning frame 27 rides on the inclined portion 81a, and the inclined portion 27c rides on the main assembly guide portion 81. By doing so, the process cartridge 7 is displaced toward the intermediary transfer unit 5 (upwardly).

In FIG. 5, (c) illustrates the state where the process cartridge is mounted to the main assembly 100A of the apparatus 100. When the mounting operation of the process cartridge 7 is further continued after the process cartridge 7 moves toward the intermediary transfer unit 5, the abutting portion 27d provided integrally on the cleaning frame 27 contacts to a rear side plate 83 of the apparatus main assembly 100A. By doing so, the mounting of the process cartridge 7 to the image forming apparatus 100 is completed.

In this state, a portion-to-be-urged 11a of the drum-rear bearing 11 contacts the back pressed member 91 provided in the rear side plate 83, so that it is upwardly pushed by the pressing spring 92. And, the cartridge positioning portion 11b provided in the upper position of the drum-rear bearing 11 contacts the abutting portion 83a, which functions as the main assembly positioning portion, of the rear side plate 83, by which the process cartridge 7 is positioned relative to the apparatus main assembly 100A in the rear side.

In addition, a portion-to-be-pulled 10a of the drum-front bearing 10 engages with the pulling member 93 provided in a front side plate 82. The pulling member 93 is upwardly raised by a tension spring 94 provided on the front side plate 82, and by doing so, the portion-to-be-pulled 10a is also upwardly raised. And, an abutting portion 10b which is cartridge positioning portion for the drum-front bearing 10 contacts a positioning portion 82b which is the main assembly positioning portion of the main assembly front side plate 82, so that the process cartridge 7 is positioned relative to the apparatus main assembly 100A in the front side.

Figure 6:
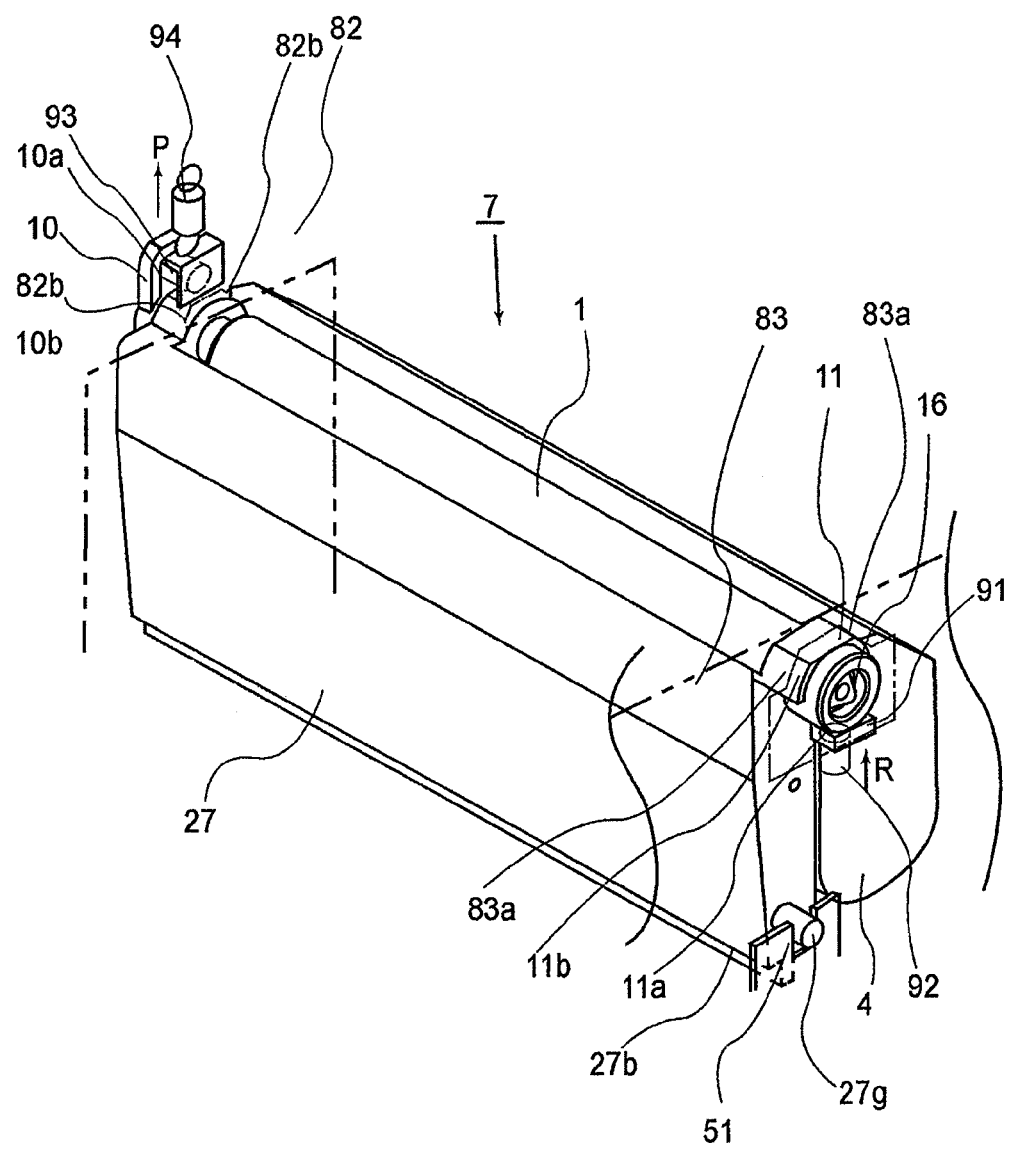
FIG. 6 is a perspective view showing the state where the process cartridge according to Embodiment 1 is positioned in the main assembly of the image forming apparatus.

As shown in FIG. 6, the abutting portion 83a substantially has a V configuration, and contacts the positioning surface 11b of the drum-rear bearing 11. The drum-front bearing 10 is pulled in the direction of Arrow P by the locking with the portion-to-be-pulled 10a of the drum-front bearing 10 of the pulling member 93 provided in the front side plate 82. Relating to positioning, it is contacted to the drum positioning portion 82b which is provided in the front side plate 82 and which has a substantially V configuration, similar to the case of the drum-rear bearing 11. The pressure required for the positioning, relative to the main assembly 100A of the apparatus 100, of the drum-front bearing 10 and the drum-rear bearing 11, is applied in the direction of Arrows P and R. Therefore, the process cartridge 7 is positioned, namely, the drum-front bearing 10 and the drum-rear bearing 11, which support the photosensitive drum 1 rotatably, can be correctly positioned relative to the main assembly 100A of the apparatus 100. In addition, the cleaning frame 27 is provided with a boss 27g which functions as a rotation stopper for the process cartridge 7 on the side surface, and the boss 27g engages with the rotation stopper receptor member 51 provided in the apparatus main assembly 100A. By doing so, the rotation in the apparatus main assembly 100A of the process cartridge 7 is prevented. For easy understanding of the description, the driving side engaging portion 23 is omitted in FIG. 6.

(Structures of Developing Roller Supporting Portion and Developing Drive Force Input Portion in Process Cartridge)

Figure 7:
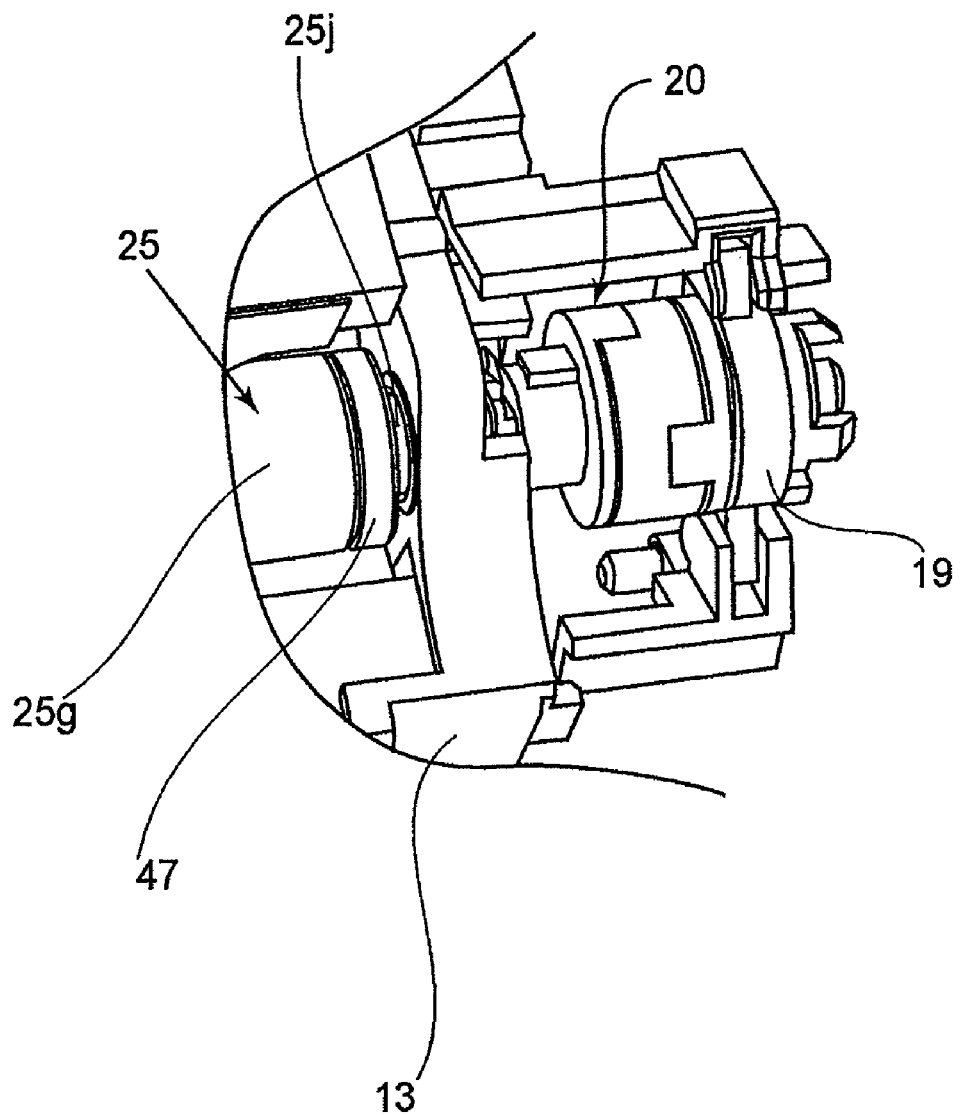
FIG. 7 illustrates a supporting structure for a developing roller according to Embodiment 1.

Referring to FIG. 7-FIG. 11 a description will be provided about the supporting structure for the structure of the developing drive force input portion, and the developing roller 25 in the process cartridge 7 of this embodiment. FIG. 7 illustrates one longitudinal end side (rear side) of the supporting portion of the developing roller 25. In FIG. 7, the developing roller shaft 25j of the developing roller 25 is rotatably engaged with the inner surface of the developing-device-rear bearing 13. Between the rubber roller portion 25g of the developing roller 25 and the developing-device-rear bearing 13, a regulation roller 47 for regulating the degree of contact, to the photosensitive drum 1, of the developing roller 25 engages with the developing roller shaft 25j rotatably. Heretofore, the supporting structure by the side of the one longitudinal end of the developing roller 25 is described, but the bearing portion is similarly provided to the bearing member integrally at the other end side in the longitudinal direction to support the other end side of the developing roller shaft 25j rotatably.

Figure 8:
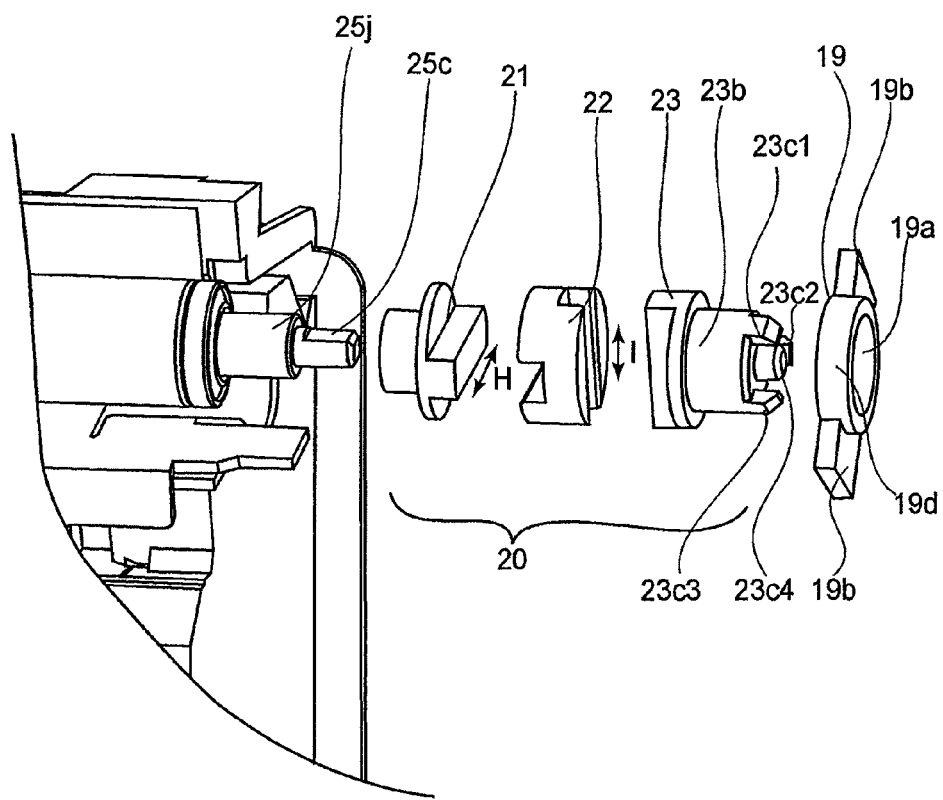
FIG. 8 is an exploded view of a shaft coupling member according to Embodiment 1.
Figure 9:
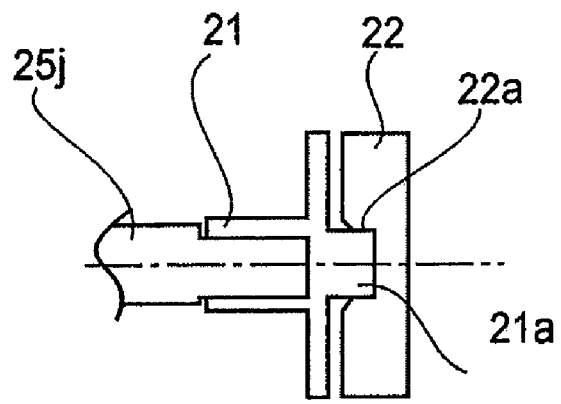
FIG. 9 is a sectional view of the shaft coupling member according to Embodiment 1.
Figure 9:
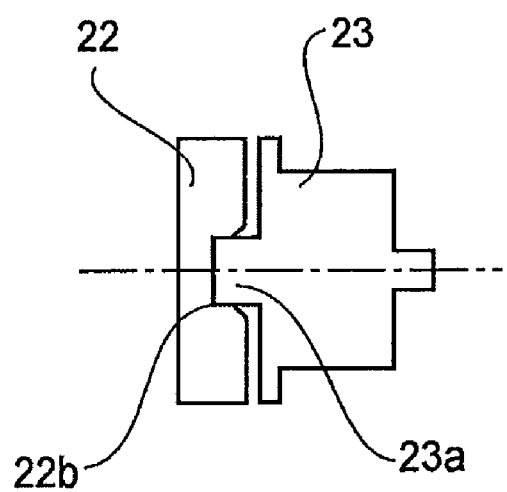

In this embodiment, an Oldham coupling 20, which is a shaft coupling member is used as the developing drive force input portion. Referring to FIG. 8 and FIG. 9, the structure of the Oldham coupling 20 will be described. For easy understanding of the Oldham coupling 20, the developing-device-rear bearing 13 is omitted, here.

As shown in FIG. 8, the Oldham coupling 20 comprises a driven side engaging portion 21, an intermediary engaging portion 22, and a driving side engaging portion 23.

The driven side engaging portion 21 is fixed to the end of the developing roller shaft 25j. As for the fixing method, the spring pin and the parallel pin can be used. In addition, as shown in FIG. 8, in an alternative structure, the cut portion 25c is provided on a peripheral surface of the developing roller shaft 25j, and a hole provided in the driven side engaging portion 21 is provided with the complementary configuration. A shaft portion 23b of the driving side engaging portion 23 is rotatably retained in the hole 19a of an engaging portion bearing member 19. The driving side engaging portion 23 is provided integrally with the projections 23c1 to 23c4 and is engageable with a main assembly development coupling 53 (FIG. 11), which is a second main assembly drive transmission member of the main assembly 100A of the apparatus 100, as will be described hereinafter. This Oldham coupling 20 transmits the rotational driving force (second rotational driving force) from the main assembly 100A of the apparatus 100 to the developing roller 25, permitting the deviation between the axis of the main assembly development coupling 53 and the axis of the developing roller 25.

Referring to sectional view of FIG. 9, the Oldham coupling 20 will be described in more detail. FIG. 9 (a) is the sectional view taken along the surface perpendicular to the direction of arrow H of FIG. 8 and FIG. 9 (b) is the sectional view taken along the surface perpendicular to the direction of arrow I in FIG. 8.

The driven side engaging portion 21 is provided integrally with a rib 21a as shown in FIG. 9 (a). A groove 22a is formed on the intermediary engaging portion 22, and the rib 21a and the groove 22a are engaged with each other in FIG. 8 for movement in the direction of arrow H.

The driving side engaging portion 23 is provided integrally with a rib 23a as shown in FIG. 9 (b). A groove 22b is formed in the intermediary engaging portion 22, and the rib 23a and the groove 22b are engaged with each other for the movement in the direction of arrow I in FIG. 8.

Figure 10:
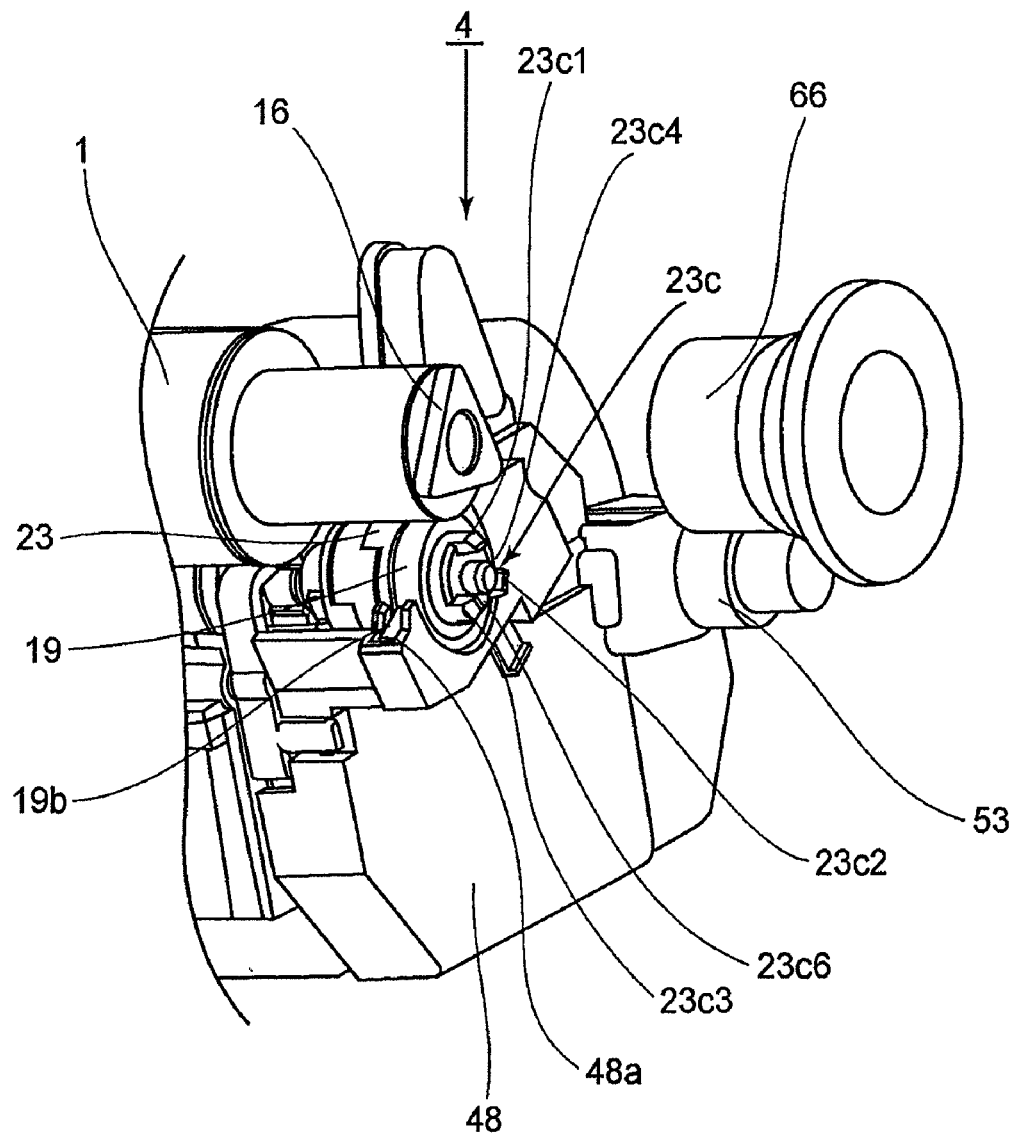
FIG. 10 is a perspective view of the shaft coupling member of a developing unit according to Embodiment 1.

FIG. 10 illustrates the structure of the coupling provided in the process cartridge 7. The projections 23c1-23c3 projected toward the axial direction are formed in the end surface of the driving side engaging portion 23 of the Oldham coupling 20 mounted to the developing unit 4. A centering boss 23c4 for alignment (rotation axis) relative to the main assembly development coupling 53 projects in the direction of the axis from the end surface of the driving side engaging portion 23. The one end side of the axial direction of the photosensitive drum 1 is provided with a drum coupling 16 of a triangular prism configuration. A guide portion 19b of the engaging portion bearing member 19 is guided by the groove 48a of a side cover 48 fixed by an unshown screw and so on to the developing unit 4, for movement in the direction crossing with the axial direction of the developing roller 25. In other words, the driving side engaging portion 23 is movable in the direction crossing with the developing unit 4.

Figure 11:
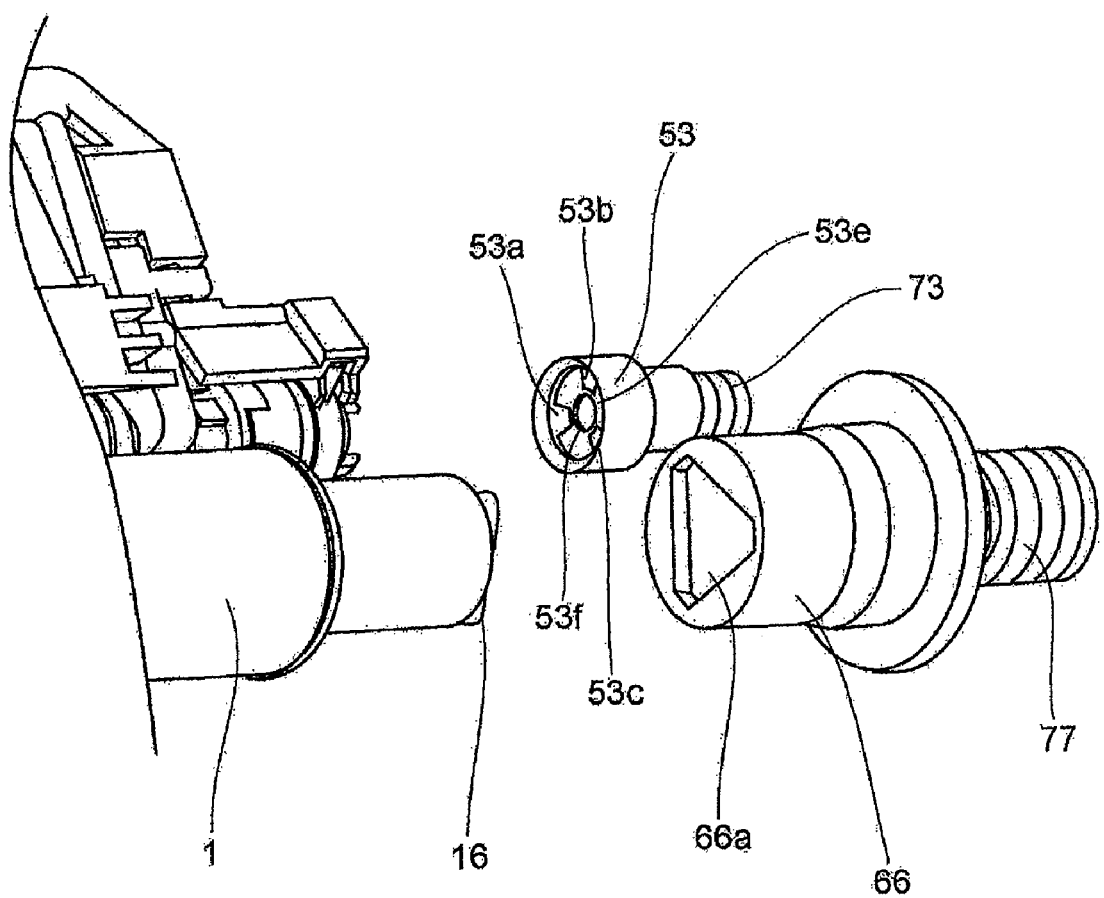
FIG. 11 is a perspective view which illustrates a first main assembly drive transmission member and a second main assembly drive transmission member of the image forming apparatus according to Embodiment 1.

FIG. 11 illustrates the structure of the coupling provided in the main assembly 100A of the apparatus 100. As shown in FIG. 11, the drum drive coupling 66, which is the first main assembly drive transmission member for transmitting the driving force of the main assembly 100A of the apparatus 100 to the photosensitive drum 1, is provided with a hole 66a which has the section of substantially triangular shape. The main assembly development coupling 53, which is the second main assembly drive transmission member for transmitting the rotational driving force (second rotational driving force) to the developing roller 25 from the main assembly 100A of the apparatus 100, is provided with holes 53a-53c. The drum drive coupling 66 is urged by a pressing member 77, such as the compression spring, toward the process cartridge 7. The drum drive coupling 66 is movable in the axial direction of the photosensitive drum. When a phase deviation occurs between the drum coupling 16 and the hole 66a of the drum drive coupling 66 at the time of the mounting, to the main assembly 100A of the apparatus 100, of the process cartridge 7, the drum drive coupling 66 is pushed and retracted by the drum coupling 16. However, the drum coupling 16 and the hole 66a are brought into engagement with each other by the drum drive coupling 66 rotating, so that the rotational driving force is transmitted to the photosensitive drum 1.

The main assembly development coupling 53 is urged by a pressing member 73, such as a compression spring, toward the process cartridge 7 in the direction parallel with the axial direction of the photosensitive drum 1. However, the main assembly development coupling 53 is mounted to the main assembly 100A of the apparatus 100 without play with respect to the direction crossing with the axial direction. In other words, the main assembly development coupling 53 is movable only in the axial direction except during the rotation for the drive transmission.

When the driving side engaging portion 23 and the main assembly development coupling 53 engage with each other by the entrance in the main assembly 100A of the apparatus 100 of the process cartridge 7, a phase deviation may occur between the projections 23c1 to 23c3 and the holes 53a-53c. In this case, the free ends of the projections 23c1 to 23c3 abut at the positions other than the holes 53a-53c, and the main assembly development coupling 53 retracts in the axial direction against the urging force of the pressed member 73. However, when the main assembly development coupling 53 rotates and the phases between projections 23c1-23c3 and the holes 53a-53c align with each other, the main assembly development coupling 53 is advanced by the urging force of the pressing member 73. The projections 23c1 to 23c3 and the holes 53a-53c are brought into the engagement with each other, so that the centering boss 23c4, which is the engaging portion positioning portion, and the centering hole 53e, which is transmission member positioning portion, are engaged with each other. The axis (rotation axis) of the driving side engaging portion 23 and the main assembly development coupling 53 are aligned. The projections 23c1 to 23c3 and the holes 53a-53c are engaged with each other by the main assembly development coupling 53 rotating, so that the rotational driving force is transmitted to the developing roller 25.

Here, the driving force to the drum drive coupling 66 and to the main assembly development coupling 53 is supplied from a motor provided in the main assembly 100A of the apparatus 100. One motor may be provided for each of the process cartridges, or commonly for a plurality of the process cartridges.

(Operation of Oldham Coupling at the Time of Development Separation-Contact Operation in Process Cartridge)

Referring to FIG. 12-FIG. 15, the operation of the Oldham coupling in the process cartridge 7 of this embodiment will be described.

Figure 12:
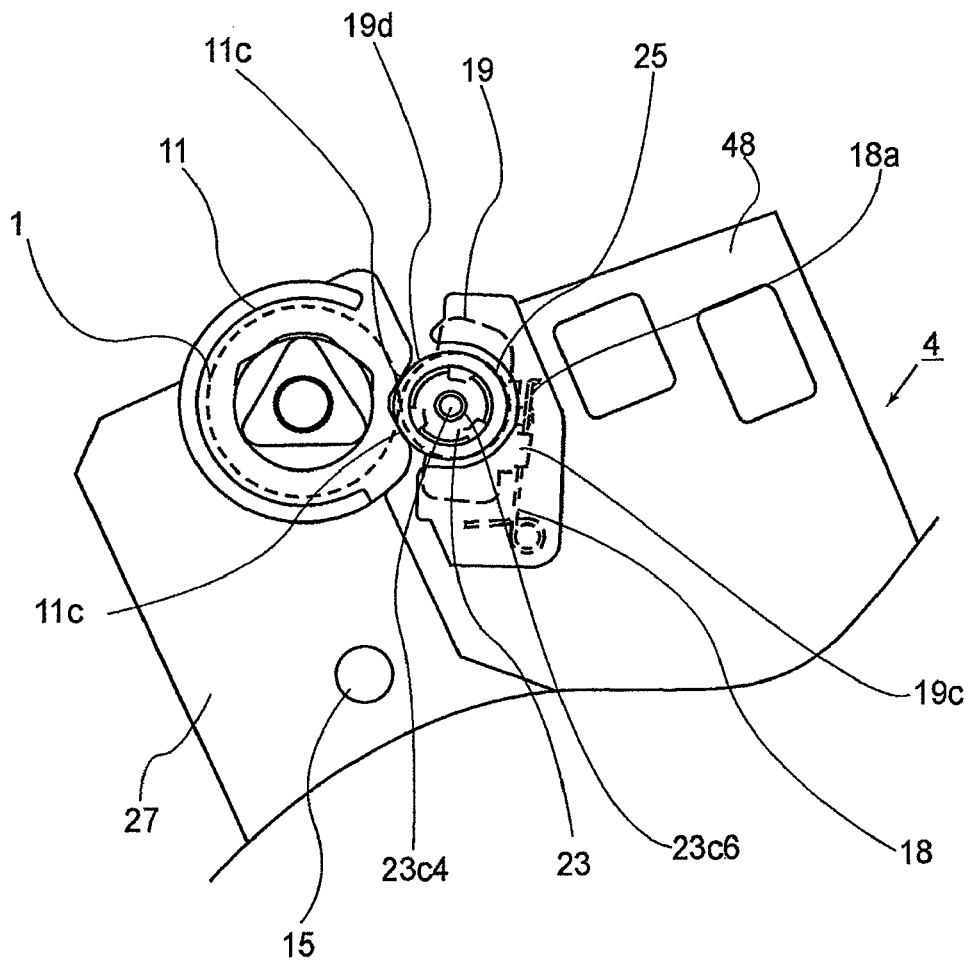
FIG. 12 is a side view which illustrates an operation of the shaft coupling member before the mounting of the process cartridge according to Embodiment 1.
Figure 13:
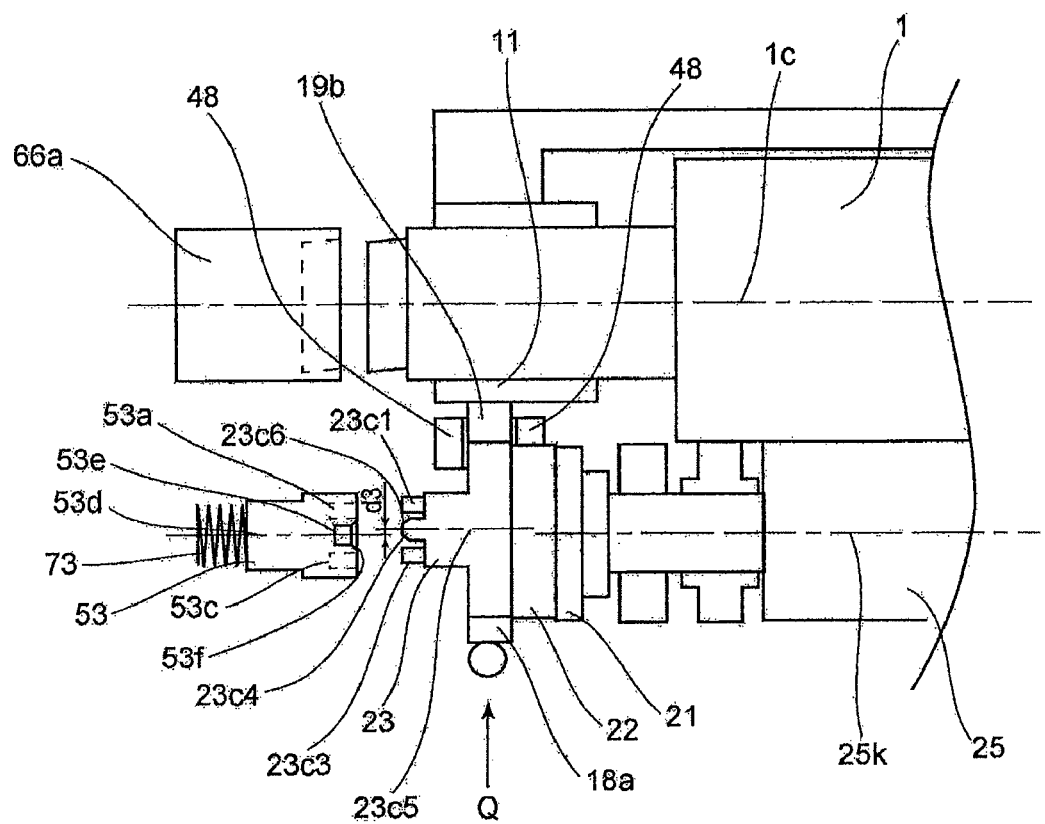
FIG. 13 is a schematic illustration which illustrates the operation of the shaft coupling member before the mounting of the process cartridge according to Embodiment 1.

FIG. 12 is a side view which illustrates the state before the process cartridge 7 is mounted to the image forming apparatus 100 main assembly, and FIG. 13 is a longitudinal sectional view thereof.

As shown in FIG. 12, as mentioned above, before the process cartridge 7 is mounted to the main assembly 100A of the apparatus, the developing roller 25 and the photosensitive drum 1 are in abutment to each other. An arm portion 18a of an urging member 18, which is a torsion coil spring provided on the side cover 48, is in abutment to the locking portion 19c of the engaging portion bearing member 19. By doing so, the driving side engaging portion 23 is urged in the direction (the direction of arrow Q in FIG. 13) crossing with the axial direction of the developing roller 25. Therefore, the contact portion 19d of the engaging portion bearing member 19 is contacted to the contact portion 11c, which is the holding portion provided in the drum-rear bearing 11, and the engaging portion bearing member 19 is positioned. More particularly, the driving side engaging portion 23 is positioned in the constant position. Here, the contact portion 11c of the drum-rear bearing 11 is formed by the two surfaces which are in parallel with the axis of the photosensitive drum 1 and which constitute the shape of a V. The engaging portion bearing member 19 can be retained in parallel with the axis 1c of the photosensitive drum 1 by contacting the engaging portion bearing member 19 to this contact portion 11c. In addition, the drum-rear bearing 11 is provided integrally with a positioning portion 11b. Therefore, the driving side engaging portion 23 rotatably supported by the engaging portion bearing member 19 is positioned with high precision relative to the rear side plate 83 of the apparatus main assembly 100A which positions the positioning portion 11b. Therefore, it is positioned with high precision also relative to the axis 53d of the main assembly development coupling 53 provided in the apparatus main assembly 100A. The driving side engaging portion 23 of the Oldham coupling 20 is rotatably engaged with the engaging portion bearing member 19. For this reason, although the axis 23c5 of the driving side engaging portion 23 of the Oldham coupling 20 is separated from the axis 25k of the developing roller 25 by the distance d3 in this state, they are very close to each other. More particularly, the driving side engaging portion 23 is the positioning position, such that the engagement with the main assembly development coupling 53 is smooth at the time of the entrance of the process cartridge 7 to the main assembly 100A of the apparatus. Although the member which urges the engaging portion bearing member 19 is the urging member 18 in this embodiment, the engaging portion bearing member 19 may be provided with the elastically deformable elastic portion, so that the engaging portion bearing member 19 is contacted to the contact portion 11c.

Figure 15:
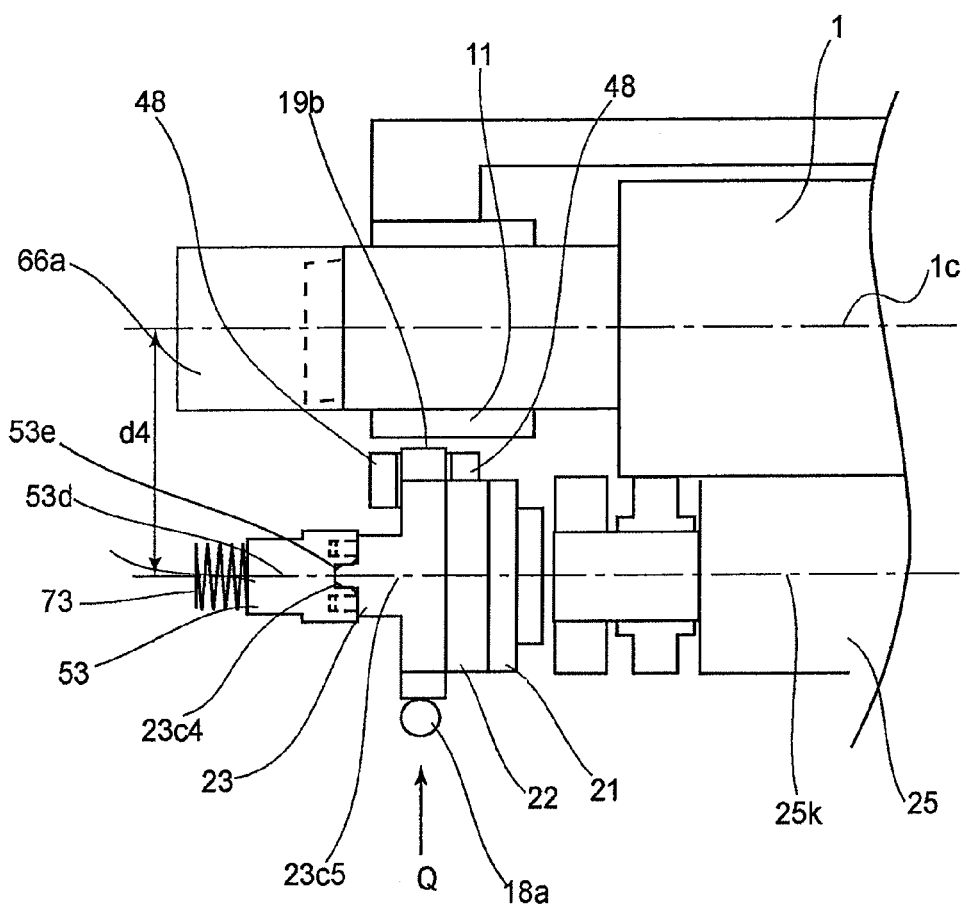
FIG. 15 is a schematic illustration which illustrates the operation of the shaft coupling member after the mounting of the process cartridge according to Embodiment 1.

A more detailed description will be provided by referring to FIG. 13 here. When the driving side engaging portion 23 engages with the main assembly development coupling 53 and it rotates, the driving side engaging portion 23 is positioned by the main assembly development coupling 53 as will be described hereinafter. By this, the contact portion 19b of the engaging portion bearing member 19 is spaced s from the drum-rear bearing 11, i.e. the contact portion 11c. Therefore, when the process cartridge 7 enters the main assembly 100A of the apparatus 100, the axis 23c5 of the driving side engaging portion 23 begins the engagement in the state of being deviated from axis 53d of the main assembly development coupling 53 to the photosensitive drum 1 side by a predetermined distance d3. The process cartridge further enters from this state, by which the bevelled portion 23c6 (FIG. 10) provided in the centering boss 23c4 and 53f (FIG. 11) of bevelled portions provided in the hole 53e contact with each other, and they engage with each other, correcting the axial deviation. At this time, the driving side engaging portion 23 is positioned by the contact portion 11c with high precision relative to the main assembly 100A of the apparatus 100. Therefore, it is positioned with high precision relative to the main assembly development coupling 53 provided in the apparatus main assembly 100A. Therefore, there is no need to substantially upsize the bevelled portion 23c6 and the bevelled portion 53f, and the driving side engaging portion 23 and the main assembly development coupling 53 can be downsized. As shown in FIG. 15, when the main assembly development coupling 53 rotates and the phases of the projections 23c1 to 23c3 of the driving side engaging portion 23 and the holes 53a-53c of the main assembly development coupling 53 align, the boss 23c4 and the hole 53e engage with each other. By this operation, the rotation axis 23c of the driving side engaging portion 23 and the rotation axis 53d of the main assembly development coupling 53 align with each other.

Figure 14:
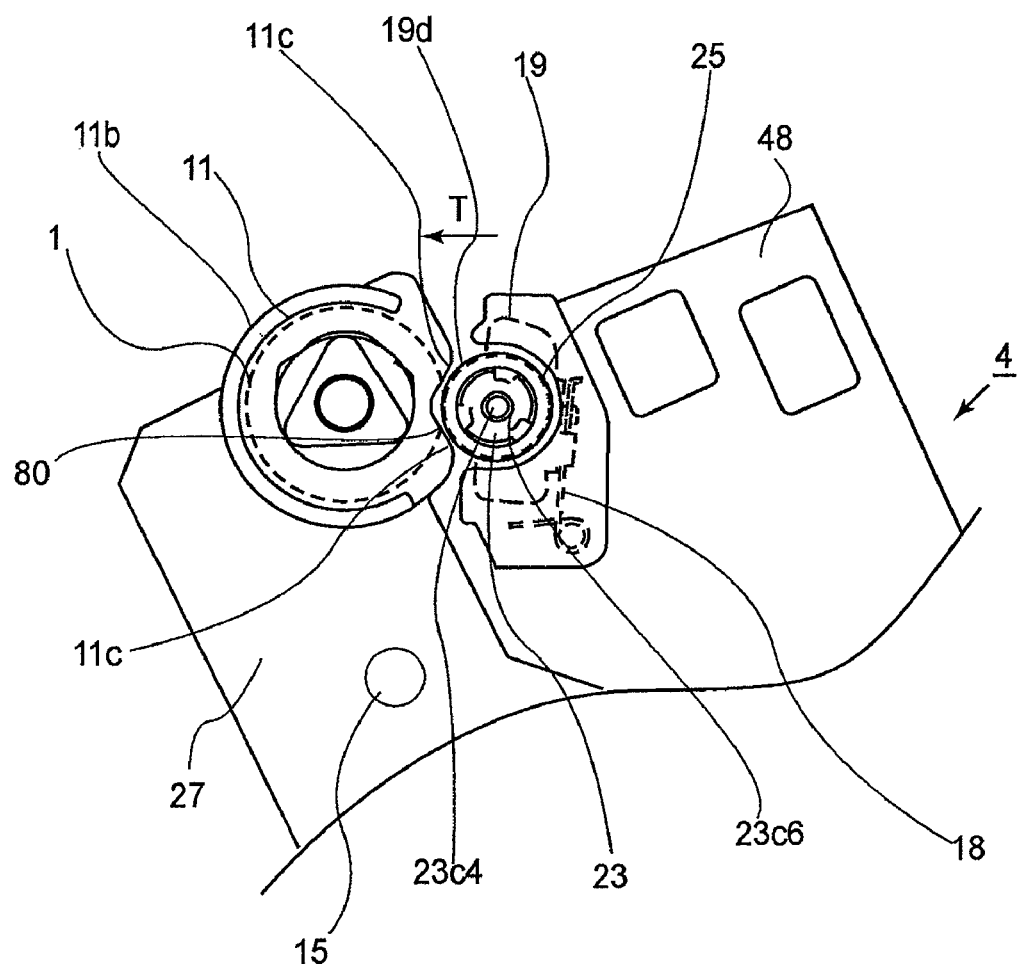
FIG. 14 is a side view which illustrates the operation of the shaft coupling member after the mounting of the process cartridge according to Embodiment 1.

FIG. 14 illustrates the state where the process cartridge is mounted to the main assembly 100A of the apparatus 100. FIG. 15 is a longitudinal sectional view. The driving side engaging portion 23 of the Oldham coupling 23 in the process cartridge 7 and the main assembly development coupling 53 of the apparatus main assembly 100A are engaged with each other in an unshown the main assembly 100A of the apparatus. More particularly, the driving side engaging portion 23 of the Oldham coupling 20 is positioned in the main assembly development coupling 53 by the engagement with the boss 23c4 and the hole 53e. As shown in FIG. 15, the driving side engaging portion 23 and the main assembly development coupling 53 are locked with each other with the gap 80 between the engaging portion bearing member 19 and the drum-rear bearing 11. The axis 25k of the developing roller, the axis 23c5 of the driving side engaging portion 23, and the axis 53d of the main assembly development coupling 53 are substantially aligned. The distances from the respective drum axis 1c are d4.

In the above described embodiment, the rotational driving force is directly inputted to the developing roller 25 through the coupling 22 from the main assembly development coupling 53 rotated independently of the drum drive coupling 66 for inputting the rotational driving force to the photosensitive drum 1. Therefore, the influence of the rotation of the developing roller 25 on the rotational accuracy of the photosensitive drum 1 is suppressed, and furthermore, the rotational accuracy of the developing roller 25 per se is improved, and therefore, the image quality is improved.

In addition, the driving side engaging portion 23 of the Oldham coupling 20 is positioned relative to the cartridge 7, and it is movable in the direction crossing with the axis 25k of the developing roller 25, and therefore, the main assembly development coupling 53 and the driving side engaging portion 23 can engage without using a large guide (saving space) and so on. Therefore, the process cartridge 7 and the image forming apparatus 100 can be downsized. In addition, the mounting operability of the process cartridge 7 to the main assembly 100A of the apparatus 100 is improved.

Embodiment 2

Figure 16:
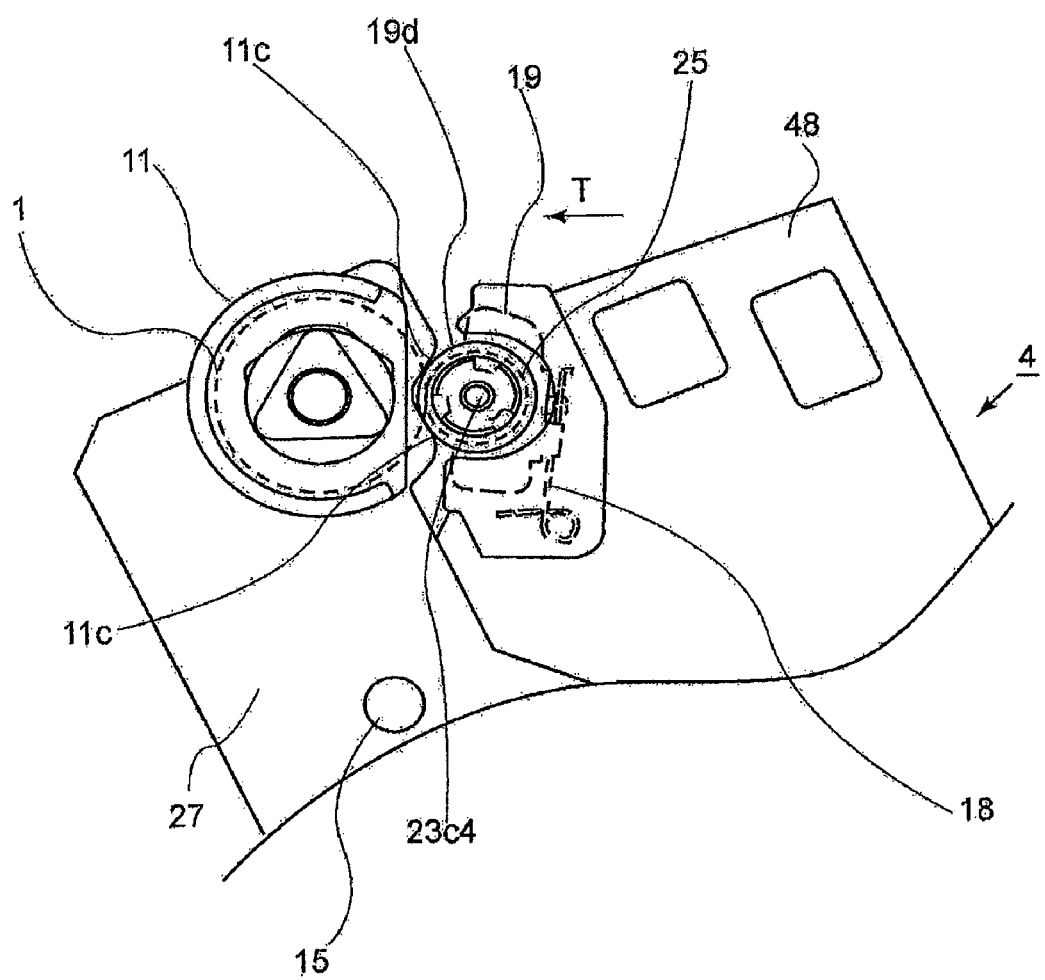
FIG. 16 is a side view which illustrates the positioning for the shaft coupling member according to Embodiment 2.

In the first embodiment, the engaging portion bearing member 19 is urged to the drum-rear bearing 10 which supports the photosensitive drum 1. As shown in FIG. 16, however, the contact portion 27f which is the holding portion contactable to the engaging portion bearing member 19 may be provided in the cleaning frame 27.

FIG. 16 illustrates the state before the process cartridge 7 is mounted to the main assembly 100A of the apparatus. As has been described with respect to Embodiment 1, the arm portion 18a of the urging member 18, which is provided on the side cover 48 and which is a twisted coil spring, contacts the locking portion 19c of the engaging portion bearing member 19. By this operation, the driving side engaging portion 23 is urged in the direction crossing with the axial direction of the developing roller 25. Therefore, the contact portion 19d of the engaging portion bearing member 19 is contacted to the contact portion 27f provided in the cleaning frame 27, so that the engaging portion bearing member 19 is positioned in place. The contact portion 27f of the cleaning frame 27 is formed by two surfaces which are in parallel with the axis of the photosensitive drum 1 and which constitute a V configuration. The cleaning frame 27 is provided with the drum-rear bearing 11, and the drum-rear bearing 11 is provided integrally with positioning portion 11b. Therefore, the driving side engaging portion 23 rotatably supported by the engaging portion bearing member 19 is positioned with high precision relative to the rotation axis of the photosensitive drum 1 and the main assembly 100A of the apparatus 100. For this reason, it can be positioned with high precision relative to the axis 53d of the main assembly development coupling 53 provided in the main assembly 100A of the apparatus 100. The other structures are the same as that of those of the first embodiment, and the effects similar to the effects of the first embodiment are provided.

Embodiment 3

Figure 17:
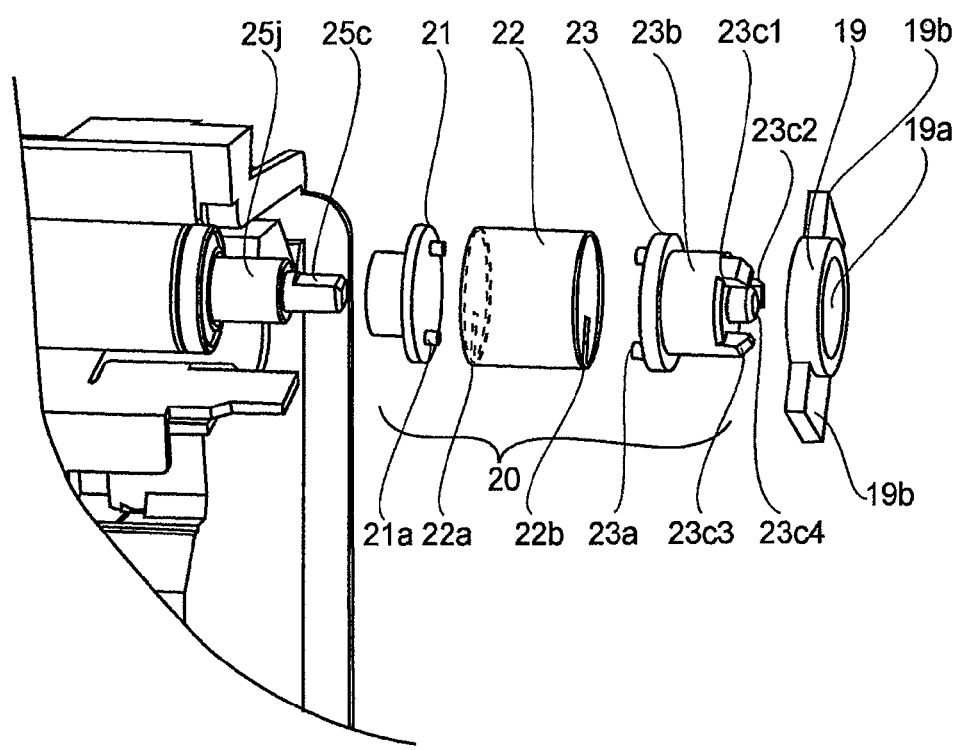
FIG. 17 is a perspective view which illustrates the shaft coupling member according to Embodiment 3.

Although the Oldham coupling is used as the shaft coupling member in the first embodiment, a spring which is the elastic portion may be used as the intermediary engaging portion 22 of the shaft coupling member 20 as shown in FIG. 17, in the process cartridge, which includes the developing roller, which has a small diameter.

In FIG. 17, the shaft coupling member 20 comprises a driven side engaging portion 21, an intermediary engaging portion 22, and a driving side engaging portion 23. The intermediary engaging portion includes a spring 22. The driven side engaging portion 21 is provided with a boss 21a for the engagement of the spring 22. Similarly, the driving side engaging portion 23 is provided with a boss 23a which engages with the spring 22. The spring 22 is provided with an arm portion 22a engaged with the driven side engaging portion boss 21a, and an arm portion 22b engaged with the driving side engaging portion boss 23a. The shaft portion 23b of the driving side engaging portion 23 is rotatably engaged with the hole 19a of the engaging portion bearing member 19. The driving side engaging portion 23 is provided integrally with the projections 23c1-23c4 engaged with the main assembly development coupling 53 which is the second main assembly drive transmission member of the main assembly 100A of the apparatus. Similarly to embodiment 1, when the driving force of the main assembly 100A of the apparatus 100 is transmitted to the driving side engaging portion 23, the driving force is transmitted to the arm portion 22b of the spring 22 from the development side coupling boss 23a. The rotational driving force transmitted to the spring 22 is transmitted to the boss 21a of the follow-engaging portion 21 from the arm portion 22a of the spring 22.

Figure 18:
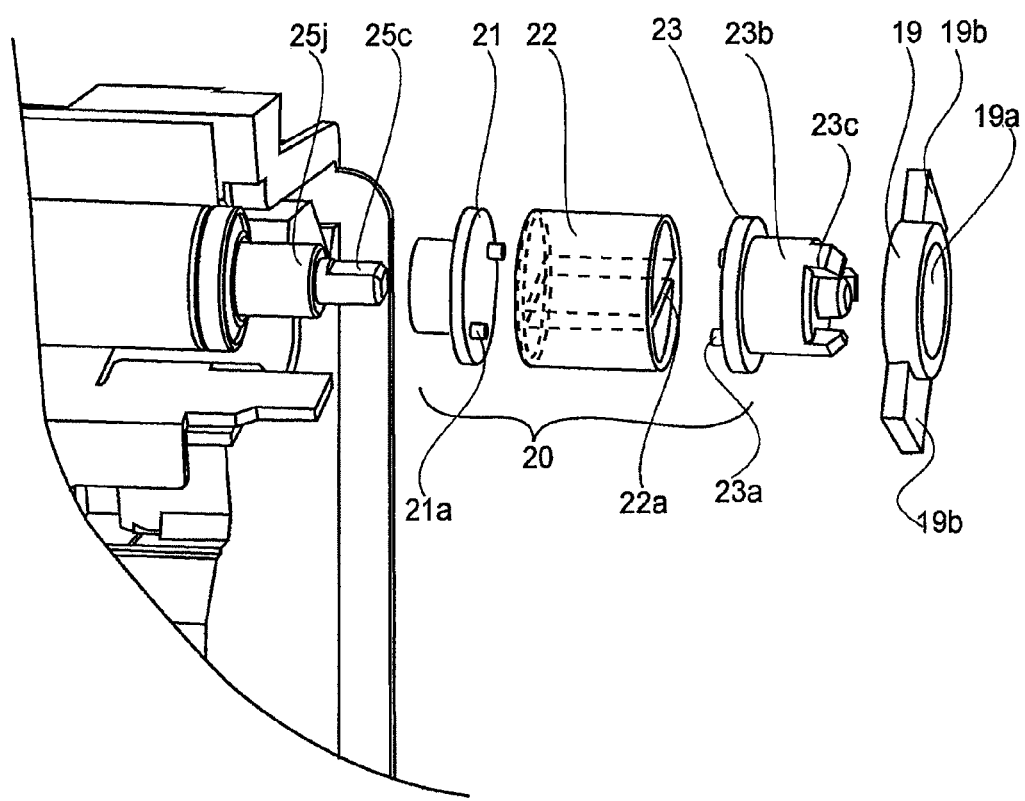
FIG. 18 illustrates an operation of the shaft coupling member according to Embodiment 3.

As shown in FIG. 18, although the spring 22 is used as the intermediary engaging portion in this embodiment, an elastic rubber 22 of the cylindrical-shape may be used as the elastic portion. The inside circumference of the elastic rubber 22 is provided with a rib 22a for transmitting the driving force by the engagement with the boss 23a of the driving side engaging portion 23 and with the boss 21a of the driven side engaging portion 21.

The other structures are the same as that of those of the first embodiment, and the effects similar to the effects of the first embodiment are provided.

Embodiment 4

Figure 19:
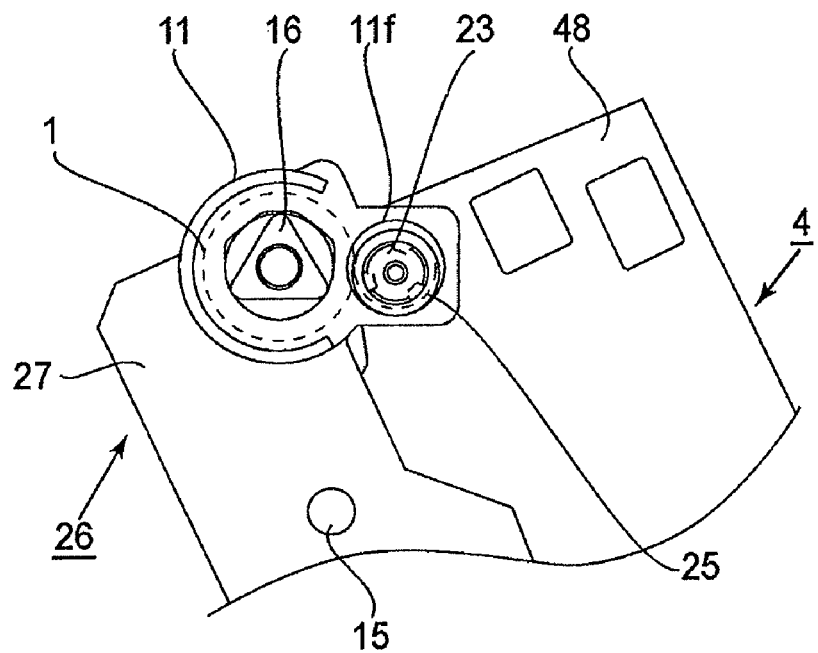
FIG. 19 illustrates an operation of the shaft coupling member according to Embodiment 4.
Figure 19:
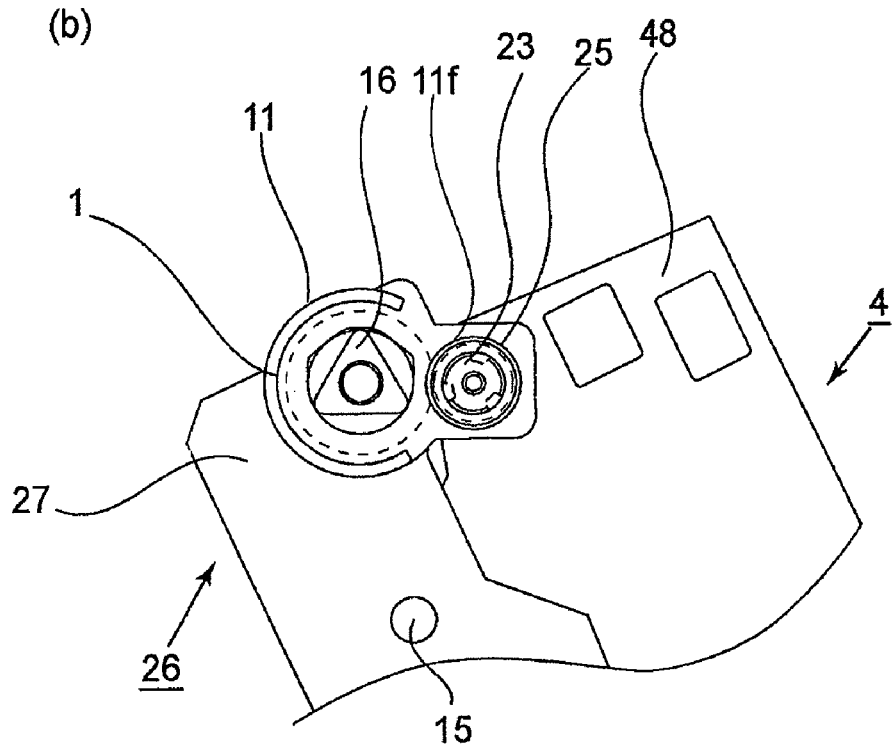

In the first embodiment, the engaging portion bearing member 19 is urged to the drum-rear bearing 10 which supports the photosensitive drum 1 by the urging spring 18. As shown in FIG. 19 (a), in this embodiment, the drum-rear bearing 11 is provided with a hole 11f which is the holding portion for retaining driving side engaging portion 23. An inner diameter of the hole 11f is large as compared with the outer diameter of the driving side engaging portion 23. More particularly, the driving side engaging portion 23 is retained for movement in the direction crossing with the axis of the developing roller 25 relative to the hole 11f. As shown in FIG. 18, in embodiment 1, the driving side engaging portion 23 is positioned through the engaging portion bearing member 19 with the deviation relative to the axis 53d of the main assembly development coupling 53 in the direction of positioning relative to the drum-rear bearing 11. In this embodiment, the structure is such that the axis 23c5 of the driving side engaging portion 23 deviates in whichever direction with respect to the direction crossing with the axis of the developing roller 25. For this reason, also when the process cartridge 7 enters the main assembly 100A of the apparatus, the driving side engaging portion 23 is smooth in the engagement with the main assembly development coupling 53. FIG. 19 (b) illustrates the state where the driving side engaging portion 23 is positioned by the main assembly development coupling (unshown). In more detail, the driving side engaging portion 23 is positioned by the main assembly development coupling (unshown), by which it is in the state of not contacting the hole 11f.

Figure 20:
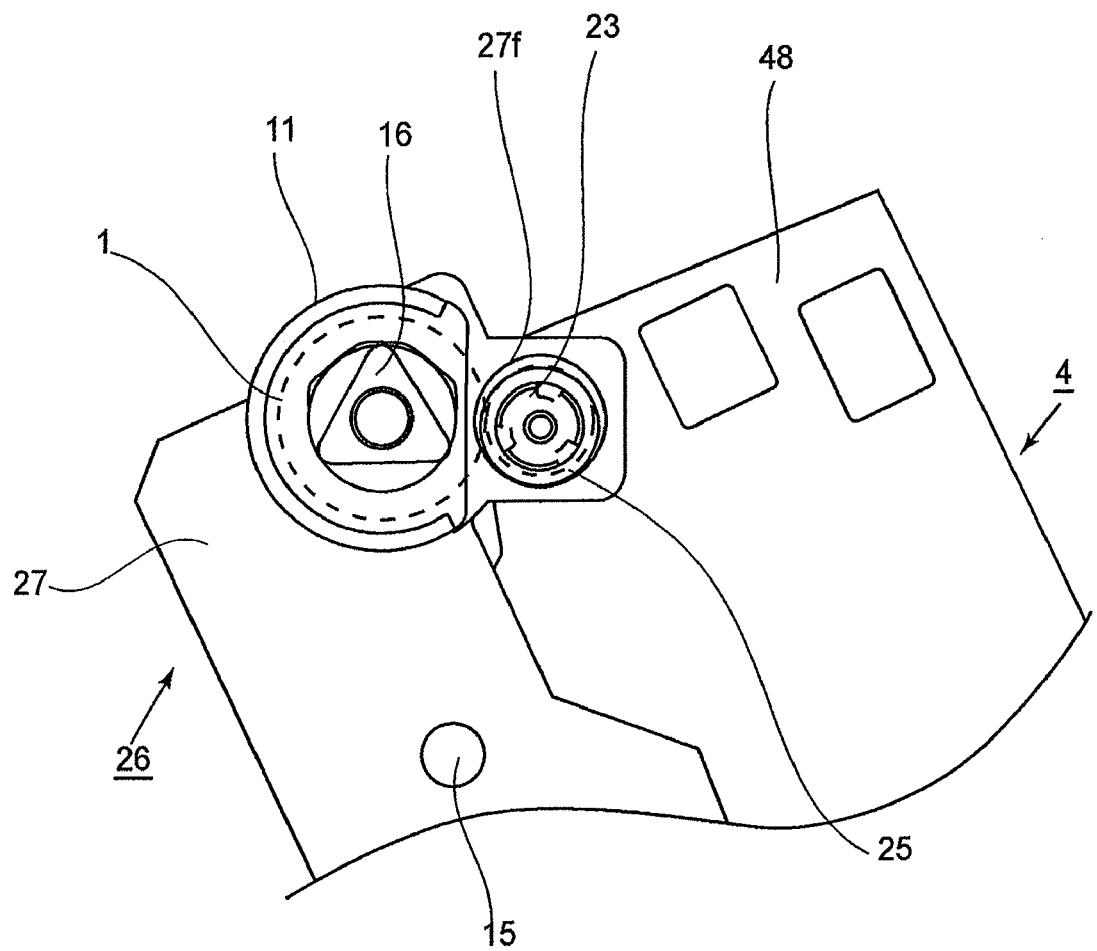
FIG. 20 illustrates an operation of the shaft coupling member according to Embodiment 4.

As shown in FIG. 20, the hole 27f for retaining the driving side engaging portion 23 may be provided in the cleaning frame 27.

The other structures are the same as that of those of the first embodiment, and provide the effects similar to the effects of the first embodiment.

Other Examples

In the above described embodiment, although the four process cartridges are used, this number is not inevitable but may be selected suitably, if necessary, by one-skilled-in-the-art.

In the embodiments mentioned above, although the image forming apparatus is a type of printer, the present invention is not limited to this. For example, it is applicable also to other image forming apparatuses, such as a copying machine and a facsimile device, and other image forming apparatuses, such as a composite machine thereof. In addition, although the intermediary transfer member is used in the embodiment mentioned above, the color toner images are superimposedly transferred onto the intermediary transfer member sequentially and the toner images carried by the intermediary transfer member are transferred onto the transfer material all together, the present invention is not limited to this type. For example, in an alternative structure, the recording material carrying member is used and the color toner images are superimposedly transferred onto the recording material carried by the recording material carrying member sequentially. The similar effects are provided when the present invention is applied to these types of image forming apparatuses.

As has been described hereinbefore, according to the present invention, a large guide for the engagement with the engaging portion and the second main assembly drive transmission member is unnecessary. Accordingly, the process cartridge and the electrophotographic image forming apparatus are downsized. Furthermore, the engaging portion and the second main assembly drive transmission member of the shaft coupling member engage with each other smoothly, and therefore, the mounting property of the apparatus is improved.

In addition, the rotational accuracy of the developing roller can be improved, and therefore, the image quality can be improved.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Applications Nos. 332838/2006 and 259661/2007 filed Dec. 11, 2006 and Oct. 3, 2007, respectively, which are hereby incorporated by reference.

What is claimed is:

1. A process cartridge detachably mountable to a main assembly of an electrophotographic image forming apparatus that includes a driving member, said process cartridge comprising:
   (A) a photosensitive drum;
   (B) a developing roller configured and positioned to (a) develop an electrostatic latent image formed on said photosensitive drum and (b) be rotatable about an axis thereof;
   (C) a coupling member provided adjacent to one axial end of said developing roller, said coupling member including:
      (i) a driven portion provided adjacent to the one axial end of said developing roller;
      (ii) an intermediary portion configured and positioned to (a) engage with said driven portion and (b) be movable relative to said driven portion in a direction crossing the axis of said developing roller while maintaining engagement with said driven portion; and
      (iii) a driving portion configured and positioned to (a) receive a driving force for rotating said developing roller, (b) engage with said intermediary portion and (c) be movable relative to said intermediary portion in a direction which crosses the axis of said developing roller and which is different from the direction of the movement of said intermediary portion while maintaining engagement with said intermediary portion; and
   (D) a retaining portion configured and positioned to retain an axis of said driving portion in a position which is deviated from the axis of said developing roller in a direction crossing the axis of said developing roller so as to enable engagement of said driving portion with the driving member when said process cartridge is inserted into the main assembly of the apparatus with said developing roller being in contact with said photosensitive drum.

2. A cartridge according to claim 1, wherein said retaining portion includes:
   (i) a holding portion configured and positioned to (a) rotatably hold said driving portion and (b) be movable in a direction crossing the axis of said developing roller together with said driving portion;
   (ii) an urging portion configured and positioned to urge said driving portion in a direction crossing the axis of said developing roller through said holding portion; and
   (iii) a stopping portion configured and positioned to stop said holding portion, which is urged by said urging portion, to enable engagement of said driving portion with the driving member when said process cartridge is inserted into the main assembly of the apparatus with said developing roller being in contact with said photosensitive drum.

3. A cartridge according to claim 2, wherein said stopping portion is disposed at a position such that the axis of said driving portion is deviated from the axis of said developing roller in a direction crossing the axis of said developing roller.

4. A cartridge according to claim 3, further comprising a drum bearing portion configured and positioned to rotatably support said photosensitive drum,
   wherein said stopping portion is provided on said drum bearing portion.

5. A cartridge according to claim 3 or 4, wherein when said developing roller develops the electrostatic latent image on said photosensitive drum, the axis of said driving portion and the axis of said developing roller are substantially aligned with each other.

6. A cartridge according to claim 2, further comprising a guiding portion configured and positioned to guide a movement of said holding portion in a direction crossing the axis of said developing roller.

7. A cartridge according to claim 2, wherein said holding portion holds said driving portion without holding said intermediary portion and said driven portion.

8. A cartridge according to claim 2, wherein said urging portion is an elastic member.

9. A cartridge according to claim 1, wherein said retaining portion includes an engaging hole configured and positioned to rotatably engage with said driving portion so that the axis of said driving portion is deviated from the axis of said developing roller in a direction crossing the axis of said developing roller.

10. A cartridge according to claim 9, wherein said engaging hole engages with said driving portion without engaging with said intermediary portion and said driven portion.

11. A cartridge according to claim 1, wherein said coupling member is an Oldham coupling.

12. A cartridge according to claim 1, wherein said photosensitive drum and said developing roller receive respective driving forces independently from each other.

13. A cartridge according to claim 12, further comprising a drum coupling member provided adjacent to one axial end of said photosensitive drum to receive a driving force for rotating said photosensitive drum.

14. A cartridge according to claim 1, wherein said developing roller is unified into a developing unit with a developer container configured and positioned to contain the developer,
   wherein said photosensitive drum is unified into a drum unit with a charging member configured and positioned to electrically charge said photosensitive drum and a cleaning member configured and positioned to clean said photosensitive drum, and
   wherein said developing unit and said drum unit are connected so as to be rotatable relative to each other.

15. An electrophotographic image forming apparatus comprising:
   a main assembly of said apparatus including a driving member configured and positioned to apply a driving force; and
   a process cartridge detachably mountable to said main assembly of said apparatus, said process cartridge including:
   (A) a photosensitive drum;
   (B) a developing roller configured and positioned to (a) develop an electrostatic latent image formed on said photosensitive drum and (b) be rotatable about an axis thereof;

(C) a coupling member provided adjacent to one axial end of said developing roller, said coupling member including:
  (i) a driven portion provided adjacent to the one axial end of said developing roller;
  (ii) an intermediary portion configured and positioned to (a) engage with said driven portion and (b) be movable relative to said driven portion in a direction crossing the axis of said developing roller while maintaining engagement with said driven portion; and
  (iii) a driving portion configured and positioned to (a) receive a driving force for rotating said developing roller, (b) engage with said intermediary portion and (c) be movable relative to said intermediary portion in a direction which crosses the axis of said developing roller and which is different from the direction of the movement of said intermediary portion while maintaining engagement with said intermediary portion; and
(D) a retaining portion configured and positioned to retain an axis of said driving portion in a position which is deviated from the axis of said developing roller in a direction crossing the axis of said developing roller so as to enable engagement of said driving portion with the driving member when said process cartridge is inserted into the main assembly of the apparatus with said developing roller being in contact with said photosensitive drum.

16. An apparatus according to claim 15, wherein said retaining portion includes:
  a holding portion configured and positioned to (a) rotatably hold said driving portion and (b) be movable in a direction crossing the axis of said developing roller together with said driving portion;
  an urging portion configured and positioned to urge said driving portion in a direction crossing the axis of said developing roller through said holding portion; and
  a stopping portion configured and positioned to stop said holding portion that is urged by said urging portion.

17. An apparatus according to claim 16, wherein said stopping portion is disposed at a position such that the axis of said driving portion is deviated from the axis of said developing roller in a direction crossing the axis of said developing roller.

18. An apparatus according to claim 17, wherein said process cartridge includes a drum bearing portion configured and positioned to rotatably support said photosensitive drum, and wherein said stopping portion is provided on said drum bearing portion.

19. An apparatus according to claim 17 or 18, wherein, when said developing roller develops the electrostatic latent image on said photosensitive drum, the axis of said driving portion and the axis of said developing roller are substantially aligned with each other.

20. An apparatus according to claim 16, wherein said process cartridge includes a guiding portion configured and positioned to guide a movement of said holding portion in a direction crossing the axis of said developing roller.

21. An apparatus according to claim 16, wherein said holding portion holds said driving portion without holding said intermediary portion and said driven portion.

22. An apparatus according to claim 16, wherein said urging portion is an elastic member.

23. An apparatus according to claim 15, wherein said retaining portion includes an engaging hole configured and positioned to rotatably engage with said driving portion so that the axis of said driving portion is deviated from the axis of said developing roller in a direction crossing the axis of said developing roller.

24. An apparatus according to claim 23, wherein said engaging hole engages with said driving portion without engaging with said intermediary portion and said driven portion.

25. An apparatus according to claim 15, wherein said coupling member is an Oldham coupling.

26. An apparatus according to claim 15, wherein said photosensitive drum and said developing roller receive respective driving forces independently from each other.

27. An apparatus according to claim 26, wherein said process cartridge includes a drum coupling member provided adjacent to one axial end of said photosensitive drum to receive a driving force for rotating said photosensitive drum.

28. An apparatus according to claim 15, wherein said developing roller is unified into a developing unit with a developer container configured and positioned to contain the developer,
  wherein said photosensitive drum is unified into a drum unit with a charging member configured and positioned to electrically charge said photosensitive drum and a cleaning member configured and positioned to clean said photosensitive drum, and
  wherein said developing unit and said drum unit are connected so as to be rotatable relative to each other.

* * * * *